US006605001B1

(12) United States Patent
Tarantino

(10) Patent No.: US 6,605,001 B1
(45) Date of Patent: Aug. 12, 2003

(54) DICE GAME IN WHICH CATEGORIES ARE FILLED AND SCORES AWARDED

(76) Inventor: Elia Rocco Tarantino, 205 E. Harmon Ave., Suite 206, Las Vegas, NV (US) 89106

(*) Notice: Subject to any disclaimer, the term of this patent is extended or adjusted under 35 U.S.C. 154(b) by 0 days.

(21) Appl. No.: 09/553,915

(22) Filed: Apr. 20, 2000

Related U.S. Application Data

(63) Continuation-in-part of application No. 09/439,934, filed on Nov. 12, 1999, which is a continuation-in-part of application No. 09/298,604, filed on Apr. 23, 1999, now abandoned.

(51) Int. Cl.[7] .............................. A63F 13/00; A63F 1/00

(52) U.S. Cl. ....................................... 463/22; 273/138.1

(58) Field of Search .............................. 463/12, 13, 10, 463/14, 16, 17, 18, 19, 20, 21, 22, 25, 26, 27, 30, 42, 28, 31, 37; 700/92; 273/138.1, 138.2, 139, 143 A, 143 R, 145 R, 146

(56) References Cited

U.S. PATENT DOCUMENTS

| | | | |
|---|---|---|---|
| 2,205,471 | A | 6/1940 | Fagerholm |
| 2,812,182 | A | 11/1957 | Fiorino |
| 2,842,368 | A | 7/1958 | Williams |
| 3,505,646 | A | 4/1970 | Affel, Jr. et al. |
| 3,655,199 | A | 4/1972 | Ohki |
| 3,843,133 | A | 10/1974 | Brown |
| 4,033,588 | A | 7/1977 | Watts |
| 4,066,264 | A | 1/1978 | Rowman |
| 4,093,215 | A | 6/1978 | Ballard |
| 4,126,851 | A | 11/1978 | Okor |
| 4,193,598 | A | 3/1980 | Freese |
| 4,247,106 | A | 1/1981 | Jeffers et al. |
| 4,322,612 | A | 3/1982 | Lange |
| 4,335,809 | A | 6/1982 | Wain |
| 4,339,798 | A | 7/1982 | Hedges et al. |
| 4,372,558 | A | 2/1983 | Shimamoto et al. |
| 4,389,048 | A | 6/1983 | Burgess |

(List continued on next page.)

FOREIGN PATENT DOCUMENTS

| | | |
|---|---|---|
| DE | 2724153 | 8/1978 |
| GB | 2190227 | 11/1987 |
| GB | 2253299 A | 2/1992 |

OTHER PUBLICATIONS

*Creative Computing*, Jan.–Feb. 1978 vol. 4, No. 1: Cover page and Contents; pp. 3–4 and 132–137.

Author unknown, "Autotote Corporation Profile," Autotote, pp. 1–5, Sep., 1993.

(List continued on next page.)

*Primary Examiner*—Kim Nguyen
(74) *Attorney, Agent, or Firm*—Weide & Miller, Ltd.

(57) ABSTRACT

An apparatus and a method facilitate single user and tournament play of wagering games. A player provides control input in order to control the game. The machine simulates the rolling of dice to obtain scoring combinations, and the player makes strategic gaming decisions concerning the holding, releasing and re-rolling of the dice, and the assignment of the resulting dice combinations to scoring categories. A game progresses as a player attempts to fill a plurality of scoring categories in order to achieve a high total score. A player wagers on each simulated roll of the dice, and is paid for wining assignments of combinations to categories. The computer-controlled slot machines are generally linked to a wide area network, facilitating tournament play among multiple players and progressive jackpots. Computer-controlled slot machines include machine-readable media reading and writing devices, allowing players to save and restore games in progress.

11 Claims, 13 Drawing Sheets

U.S. PATENT DOCUMENTS

| | | | | |
|---|---|---|---|---|
| 4,467,424 A | | 8/1984 | Hedges et al. | |
| 4,494,197 A | | 1/1985 | Troy et al. | |
| 4,506,890 A | | 3/1985 | Murry | |
| 4,517,656 A | | 5/1985 | Solimeno et al. | |
| 4,564,923 A | | 1/1986 | Nakano | |
| 4,570,930 A | | 2/1986 | Matheson | |
| 4,572,509 A | | 2/1986 | Sitrick | |
| 4,614,342 A | | 9/1986 | Takashima | |
| 4,636,174 A | | 1/1987 | Andersen et al. | |
| 4,760,527 A | | 7/1988 | Sidley | |
| 4,836,553 A | | 6/1989 | Suttle et al. | |
| 4,837,728 A | | 6/1989 | Barrie et al. | |
| 4,861,041 A | | 8/1989 | Jones et al. | |
| 4,961,581 A | | 10/1990 | Barnes et al. | |
| 4,986,546 A | | 1/1991 | Cerulla | |
| 4,995,615 A | | 2/1991 | Cheng | |
| 5,031,914 A | | 7/1991 | Rosenthal | 273/146 |
| 5,043,889 A | | 8/1991 | Lucey | |
| 5,129,652 A | | 7/1992 | Wilkinson | |
| 5,221,083 A | | 6/1993 | Dote | |
| 5,290,033 A | | 3/1994 | Bittner et al. | |
| 5,356,140 A | | 10/1994 | Dabrowski et al. | |
| 5,374,060 A | | 12/1994 | Goldberg | |
| 5,393,067 A | | 2/1995 | Paulsen et al. | |
| 5,417,424 A | | 5/1995 | Snowden et al. | |
| 5,462,277 A | | 10/1995 | Takemoto | |
| 5,472,195 A | | 12/1995 | Takemoto et al. | |
| 5,489,096 A | | 2/1996 | Aron | |
| 5,564,977 A | | 10/1996 | Algie | |
| 5,611,730 A | | 3/1997 | Weiss | |
| 5,669,817 A | | 9/1997 | Tarantino | |
| 5,687,968 A | | 11/1997 | Tarantino | |
| 5,732,948 A | * | 3/1998 | Yoseloff | 273/274 |
| 5,772,509 A | | 6/1998 | Weiss | |
| 5,788,240 A | | 8/1998 | Feinberg | |
| 5,803,451 A | | 9/1998 | Kelly et al. | 273/118 R |
| 5,816,918 A | | 10/1998 | Kelly et al. | |
| 5,823,874 A | | 10/1998 | Adams | |
| 5,823,875 A | | 10/1998 | Tarantino | |
| 5,833,538 A | | 11/1998 | Weiss | |
| 5,839,960 A | | 11/1998 | Parra et al. | 463/41 |
| 5,848,932 A | | 12/1998 | Adams | |
| 5,964,463 A | * | 10/1999 | Moore, Jr. | 273/274 |
| 5,984,779 A | | 11/1999 | Bridgeman et al. | |
| 6,007,426 A | | 12/1999 | Kelly et al. | |
| 6,120,377 A | | 9/2000 | McGinnis, Sr. et al. | 463/20 |
| 6,123,333 A | | 9/2000 | McGinnis, Sr. et al. | 273/146 |
| 6,173,955 B1 | | 1/2001 | Perrie et al. | 273/146 |
| 6,210,277 B1 | * | 4/2001 | Stefan | 463/27 |
| 6,213,876 B1 | | 4/2001 | Moore, Jr. | 463/22 |

OTHER PUBLICATIONS

Author unknown, "Electronic Yahtzee Instructions," Milton Bradley Company, pp. 1–2, 1995.

Author unknown, "Touch the Technology, The Grand Stand System" Autotote, 27 pgs., 1993.

Author unknown, "www.hasbro.com/yahtzee/original/index.html," Hasbro, 1 pg., 1996.

Author unknown, "www.hasbro.com/sampler/index.html," Hasbro, 1 pg., 1996.

Author unknown, "www.yahtzee.com," Hasbro, 2 pgs, 1996.

Author unknown, "Yahztee Instructions," Milton Bradley Company, pp. 1–8, 1996.

Burns, B., "The Encyclopedia of Games," Barnes and Noble, Inc., pp. 198–199, 1998.

Dugdale, S., "Using the Computer to Foster Creative Interaction Among Students," Plato Education Group, CERL Report E–9, pp. 1–14, Oct., 1979.

Stewart, G., "Commbat: A Tele–Game for Two," BYTE Publications Inc., pp. 100–104, Dec., 1981.

Stifle, J.E., "The Plato V Terminal," Plato Education Group, CERL Report x–50, pp. 1–58, Aug., 1977.

Wadlow, T.A., "The Xerox Alto Computer," BYTE Publications Inc., In the Queue, vol. 6, No. 9, pp. 58–63, Sep., 1981.

Wells, A., Baldwin, B., and Quarterman, S., "Documentation for Trek 2.1," pp. 1–19, Aug., 1979.

Wasserman, K., and Stryker, T., "Multimachine Games," BYTE Publications Inc., pp. 24–39.

* cited by examiner

DICE GAME IN WHICH CATEGORIES ARE FILLED AND SCORES AWARDED

CROSS REFERENCE TO RELATED APPLICATIONS

This application is a continuation-in-part of U.S. application Ser. No. 09/439,934, filed on Nov. 12, 1999, which is a continuation-in-part of U.S. application Ser. No. 09/298,604, filed on Apr. 23, 1999, now abandoned, both of which are incorporated herein by reference.

FIELD OF THE INVENTION

The present invention relates generally to methods of playing games, gaming devices and systems.

BACKGROUND OF THE INVENTION

Traditional slot machine play typically involves wagering on the spin of a mechanical or video-simulated reel. No decision making is involved, other than the decision to play. No skill is involved where the outcome of such gaming is based upon chance.

The interconnection of multiple gaming machines to facilitate a gaming system with progressive jackpots is in use today. Although such wide area links involve progressive jackpots, they do not take full advantage of the potential created by the interconnection of a plurality of gaming machines. Wide area links of gaming machines typically involve traditional computer-controlled slot machines, which, although popular, do not involve a substantial skill element. Furthermore, traditional slot machines facilitate a limited persistence of play. After any given spin, a player is likely to leave the computer-controlled slot machine, because each spin is a completed cycle rather than part of an ongoing game. A game in which each spin or turn is a part of an ongoing game would be advantageous because such a system would encourage a player to continue playing in order to complete a game in progress.

Additionally, traditional slot machine play is a solitary activity. Players compete only against the house, in an introverted process in which they interact not with each other, but only with the gaming machines. With the advent of wide area links of gaming machines, a tremendous potential exists to facilitate multiple player tournaments, in which players would not only compete for the same progressive jackpots, but actually compete against each other in real time. Such multiple player gaming would be more socially interactive, and would facilitate a fun gaming dynamic.

Also, traditional slot machines are not equipped to permit a player to take a break, and to later resume game play. If a player physically leaves an individual slot machine, that player may never revisit the specific game state which the player left behind. Because players like to take short and long term breaks for a variety of reasons, a method to allow a player to save a game state and later restore the saved game would be advantageous. Players would like to be able to take breaks of any length and later resume a saved game at the same or another physical location.

SUMMARY OF THE INVENTION

The present invention provides apparatus and method for playing various casino games. In one or more embodiments, the invention comprises a game in which the number of potential winning combinations is reduced over time. As the number of potential winning combinations is reduced, the payout associated with each remaining combination winning combination increases. In a number of the embodiments, a set of symbols are provided. After placing a wager, a number of the symbols from the set are displayed to a player. The player is permitted to hold one or more of the symbols and discard the others. Symbols from the remaining set of symbols are then displayed in replacement of the non-held symbols. The final set of displayed symbols are compared to predetermined winning combinations to determine if the player is a winner. One or more of the symbols are then removed from the set of symbols before the next round of play.

In one embodiment, the combinations comprise combinations achievable using the sides of dice (e.g., all dice showing the same indicia, the dice showing a full house, straight or the like). In one or more embodiments, the invention comprises a game in which the number of potential winning combinations is reduced as play persists by removing payable indicia based on previous pay by the player. In a number of embodiments, such comprises removing from play face(s) of the dice, by removing the symbols therefrom, replacing them with other symbols or the like.

One game in accordance with the present invention is designated herein by the term Check. In the game of Check, a player spins (rolls) five simulated dice to obtain certain scoring combinations during each turn. Each turn lasts from one to three spins. After the first spin, a player may end the turn or spin again. If a player spins again, the player may re-spin all of the dice, or hold any number of the dice and re-spin the others. After a maximum of three spins in this manner, the turn ends. Once a turn is over, the player must assign the result of the dice to one of a number of categories on a scorecard. If the result of the dice does not fit any of the categories, the player must assign a zero to one of the categories. Over the course of multiple turns, the player attempts to fill out the multiple predefined categories on the scorecard. The game is over when the player has filled all of the predefined categories and the resulting point values are accumulated.

The game of Check involves a substantial skill element. During the course of a game, a player must make various decisions, for example, whether to assign an existing score to a category or to roll again, which dice to roll again and which dice to hold, and to which category to assign a score. The outcome of the game and the amount of a player's winnings or losses are directly dependent upon the decisions the player makes.

Another such game is denoted herein by the term Z Sixty Six. In the game of Z Sixty Six, a player spins (rolls) six simulated dice to obtain three, four, five, and six of a kind. A player must achieve a minimum of three of a kind in order to begin a game.

Each turn of a game lasts from one to three spins. During the first spin of a turn, a player spins all six dice, attempting to achieve a resulting combination in which at least three of the dice are of the same numerical value. After the first spin of a turn, the number displayed by the largest plurality of the dice automatically becomes a target number for the current turn. The dice displaying the target number are automatically held, and if at least three dice displaying the target number have been generated, points are assigned to a score area associated with the target number.

After the first spin, the player re-spins the dice that were not held, attempting to generate more dice displaying the target number. Where more dice displaying the target number are generated, a predetermined number of points is added to the appropriate scoring category, and the additional scoring dice are held. After a maximum of three spins total, the turn ends. Over the course of multiple turns, the player attempts to fill out the multiple predefined, scoring categories. The game is over when the player has filled all of the predefined categories.

Another such game is a game called Z Hot Dice. In accordance with this game, a player is permitted to spin six simulated dice. It is the goal of the player to achieve the maximum number of each of the six symbols one through six via two-spin or roll rounds. After a first spin, the player selects a target number. The target number is a number displayed by one of the dice (or none, as the case may be) which has not already been played. The player holds the dice displaying the target number. The player then spins the non-held dice, resulting in a final combination of six dice. The total number of dice displaying the target number is then determined. If the player receives a sufficiently high number of dice displaying the target number, the player is awarded a winning amount. The player is permitted to continue playing until each target number has been played. After each target number has been displayed, that target number is removed from the simulated dice, reducing the total remaining numbers capable of being displayed.

The total award to the player for each target number is summed and compared against a qualifying score. The qualifying score comprises a score above which the player would be entitled to participate in a jackpot if the jackpot were then awarded.

A variety of options and other forms of play of the game of Z Hot Dice are disclosed.

Another such game is called Z Jackpot Dice. In accordance with this game, a player is permitted to spin five reels each capable of displaying each of the six symbols of a dice, and three other symbols. In one embodiment, the other symbols comprise three letters in the colors red, white and blue, with the letters being B, O, N, U and S.

In similar fashion to the game of Z Hot Dice, the player attempts to receive predetermined combinations of target numbers, the target numbers selected from the dice symbols of one through six. A pay table is provided for each winning combination of the target numbers. In addition, a bonus amount is associated with each target number.

In the course of play, the player spins the reels. If the player obtains a combination of the letters (i.e. non-target symbols), then the player is awarded the bonus amount. If the letters are not of the same color, then the player is awarded the bonus for the bonus associated with the next as yet to be played target number. If the letters are of the same color, then the player is awarded the bonus for all of the target numbers. If the spin results in a combination of the letters only, then the player is permitted to thereafter spin again to play a target number.

After the first spin (or the second spin, if the first resulted in a win based on letters only), then the player is permitted to select a target number and hold the reels displaying the target number. The player is then permitted to spin the non-held reels. Thereafter, it is determined if the player has received a winning combination of the target number. In one embodiment, the player must receive at least 3 of the target number to obtain a winning.

Winnings for each target number and any bonus winnings are added and compared against a qualifying score for determining if the player is presently permitted to participate in a jackpot award. The player is permitted to continue playing until the player has played all of the target numbers. At the conclusion of the game (whether terminated by the player or by completion of all target numbers), the player is provided with a ticket in the event the player's score is sufficiently high to qualify for jackpot participation.

In all games, the player inserts coins or utilizes another form of payment/credit to play the game. The player is paid a payout dependent upon receiving predetermined combinations of elements or categories, and the number of rolls needed to achieve the scoring dice combinations. Bonuses may be paid for successfully completing the scorecard.

Furthermore, the games directly facilitate persistence of play. Each spin is part of an ongoing game. A player is encouraged to continue playing to complete turns and games in order to maximize the resulting point values or scores accumulated on the scorecard.

The computer-controlled slot machines may be interlinked onto a local and wide-area network with other computer-controlled slot machines. This facilitates multiple player tournaments in which players compete against each other in real time, in contrast to playing "against the house." The wide area network also facilitates the payment of progressive or other special jackpots. The wide-area link may have progressive jackpots or flat-rate jackpots, and these prizes may be paid daily, weekly, monthly, and/or yearly.

Player participation in the game over time is enhanced by jackpot participation. A jackpot is preferably awarded at predetermined intervals, such as every week. If the player has obtained a qualifying score, the player is automatically permitted to participate in the jackpot. In a preferred embodiment, the player's having the highest scores (such as the twenty highest scores) at the time the jackpot is awarded are permitted to participate. In this arrangement, a player need not win a predetermined combination of symbols or the like to participate in the jackpot. All that is required is that, over the course of game play, the player receive a sufficiently high score as compared to other players. How high of a score is necessary to qualify changes during each jackpot interval.

The present invention also comprises a method by which a player may save and restore games in progress. A player may save a game onto a magnetic card, bar coded voucher, or other machine-readable medium. The player may later resume the saved game by inserting the machine-readable medium into any similar computer-controlled slot machine, either at the same location, or elsewhere on the wide area network. The computer-controlled slot machine is then initialized to the conditions and states determined by the saved game information from the machine-readable medium, and the player may resume the game from where previously terminated.

Further objects, features, and advantages of the present invention over the prior art will become apparent from the detailed description of the drawings which follows, when considered with the attached figures.

DETAILED DESCRIPTION OF THE INVENTION

The invention comprises methods and apparatus for presenting and playing a game. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention In general, one aspect of the invention comprises a game which presents to a player the opportunity to obtain an increasing payout as play continues. In one or more embodiments, the invention comprises a game in which the number of potential winning combinations is reduced over time. As the number of potential winning combinations is reduced, the payout associated with each remaining combination winning combination increases. In a number of the embodiments, as described below, the combinations comprise combinations achievable using the sides of dice (e.g., all dice showing the same face, the dice showing a full house, straight or the like). In one or more embodiments, the invention comprises a game in which the number of potential winning combinations is reduced as play persists by removing payable indicia based on previous pay by the player. In a number of embodiments described below, such comprises removing from play face(s) of the dice, by removing the symbols therefrom, replacing them with other symbols or the like. These and other aspects of the invention will become apparent when considering the detailed description below.

Figure 1:
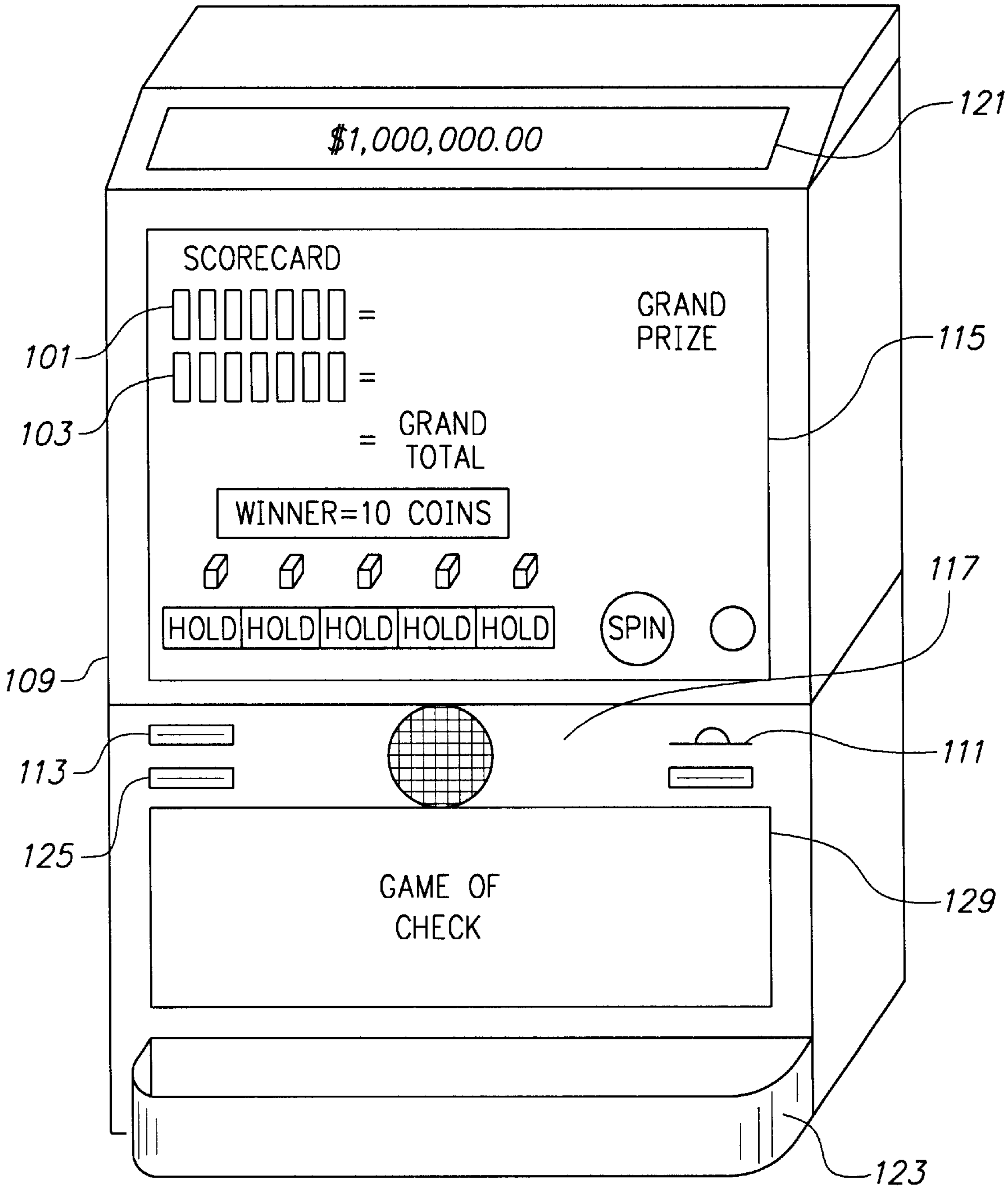
FIG. 1 is a perspective view of a computer-controlled slot machine, in accordance with one embodiment of the gaming system of the present invention.

In a preferred embodiment of the present invention, one or more games are presented for play on a computer-controlled slot machine, for example as shown in FIG. 1. As described below, these games may include the games of Check, Z Sixty Six, Z Hot Dice and Z Jackpot Dice. The computer-controlled slot machine 101 includes a microprocessor-controlled computer 103 within a tamper proof and lockable cabinet 109 having a coin acceptor 111 for wagers and a bill validator 113 for wagers, and preferably including a touch-sensitive display 115 for player input and game display. In addition, the computer-controlled slot machine includes a sound speaker 117 for output of digital sound and voice simulations, a tower light 119 (not shown) to indicate jackpots and other game statistics, and a meter 121 to display progressive jackpot information and other text. The computer 103 controls release of coins to a coin hopper 123 for paying players, and controls a ticket printer 125 for generating vouchers. The computer 103 also controls a machine-readable medium reading and writing device 129 for saving and restoring games in progress.

Figure 2:
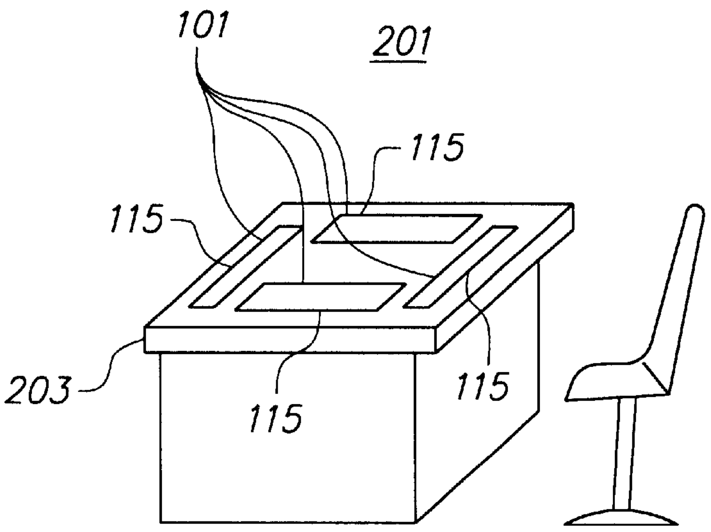
FIG. 2 is a perspective view of four computer-controlled slot machines assembled in a bar table according to another embodiment of the present invention for single or simultaneous multiple user play.

An alternative embodiment of the computer-controlled slot machine is illustrated in FIG. 2. A "bar buddy" version of a computer-controlled slot machine 201 includes all of the features of the computer-controlled slot machine 101. Each "bar buddy" computer-controlled slot machine 201 contains four such computer-controlled slot machines 101, assembled within a bar table 203. Each of the four touch-sensitive displays 115 for player input and game display are mounted in the surface of the bar table 203. The bar buddy computer-controlled slot machine 201 enables from one to four players to play games of the invention simultaneously, either against each other or against the house. The various modes of game play are detailed below.

Figure 3:
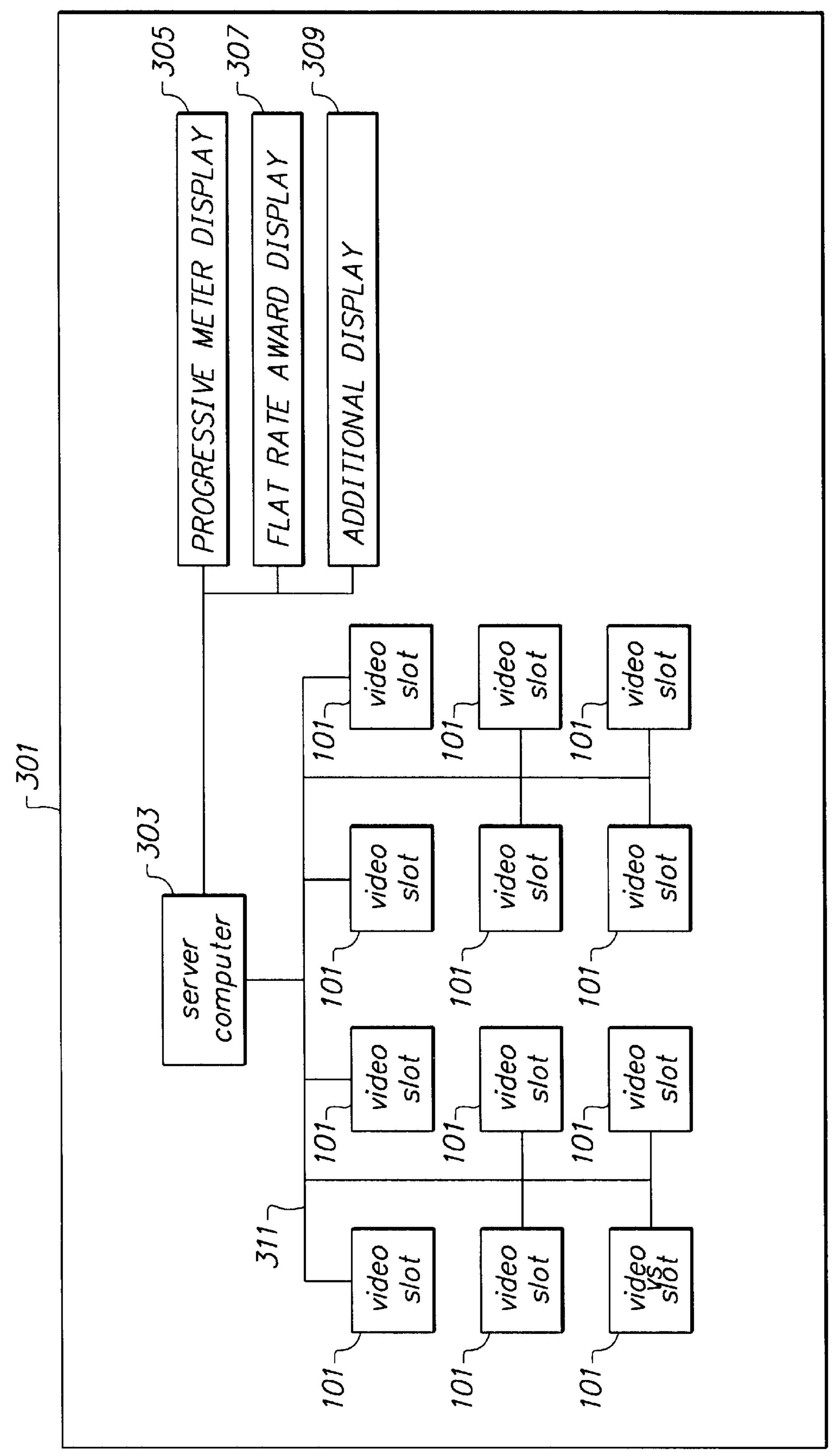
FIG. 3 is a block diagram of a local area network of computer-controlled slot machines, according to the present invention for progressive gaming activity.

Each computer-controlled slot machine 101 is preferably connected to a local area computer network as illustrated in FIG. 3. The local area computer network 301 is controlled by a microprocessor-controlled server computer 303 which controls game play, records game statistics, accounts for vouchers and jackpots, and links the games together. The local area computer network 301 also preferably includes a progressive meter display 305 for showing progressive jackpot information, a flat rate award display 307 for showing flat rate jackpot information, and an additional display 309 for showing the scores that presently qualify for jackpots on the local area network 301. In the preferred embodiment of the present invention, all of the computer-controlled slot machines 101 are connected to the local area computer network 301 in conventional manner via private dedicated lines 311. In an alternative embodiment, some or all of the computer-controlled slot machines 101 positioned at remote locations are connected to the local area computer network 301 via modems and public telephone lines operated in secure mode through encryption/decryption techniques.

Figure 4:
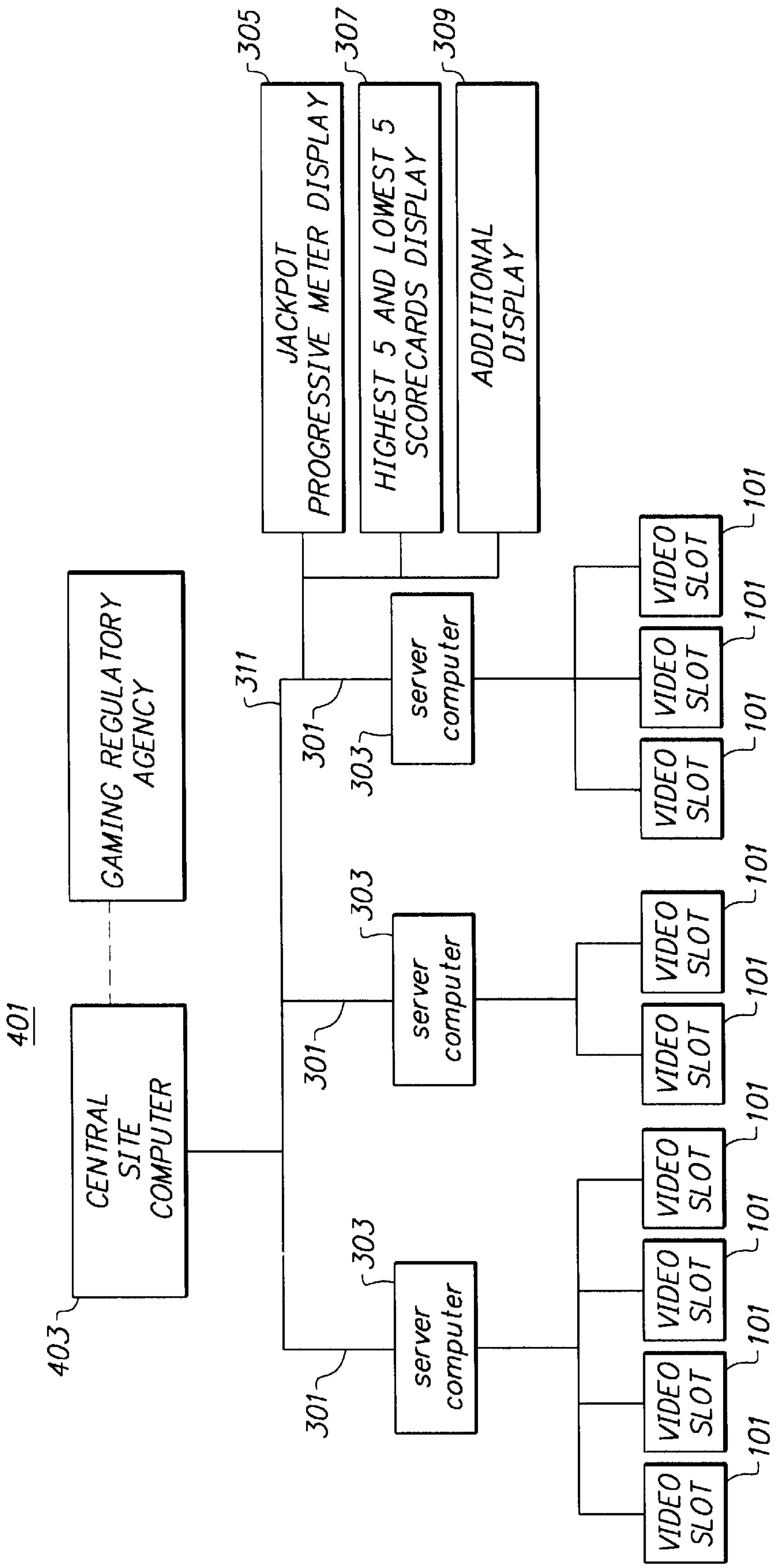
FIG. 4 is a block diagram of a wide area network of computer-controlled slot machines, according to the present invention for progressive gaming activity.

Each local area network 301 of computer-controlled slot machines 101 may be connected to a wide area computer network as illustrated in FIG. 4. The wide area computer network 401 includes local area computer networks 301 at various physical locations. The wide area computer network 401 is controlled by a central-site computer 403 which operates in 24-hour-a-day communication with all local area computer networks 301 on the wide area computer network 401 for security, accounting, and verification of games and jackpots. If a local area computer network 301 is connected to a wide area computer network 401, the progressive meter display 305, the flat rate award display 307, and the additional display 309 of that local area computer network 301 all display jackpot and other information pertaining to the entire wide area network 401. For example, the additional display 309 of a local area computer network 301 which is connected to a wide area computer network 401 shows scores that presently qualify for jackpots on the wide area network 401. In the preferred embodiment of the present invention, each local area computer network 301 is connected to the wide area computer network 401 in conventional secured cryptographic manner via private dedicated lines 311. In an alternative embodiment, some or all of the local area computer networks 301 are connected to the wide area computer network 401 in secured cryptographic manner via modems and public telephone lines.

Figure 5A:
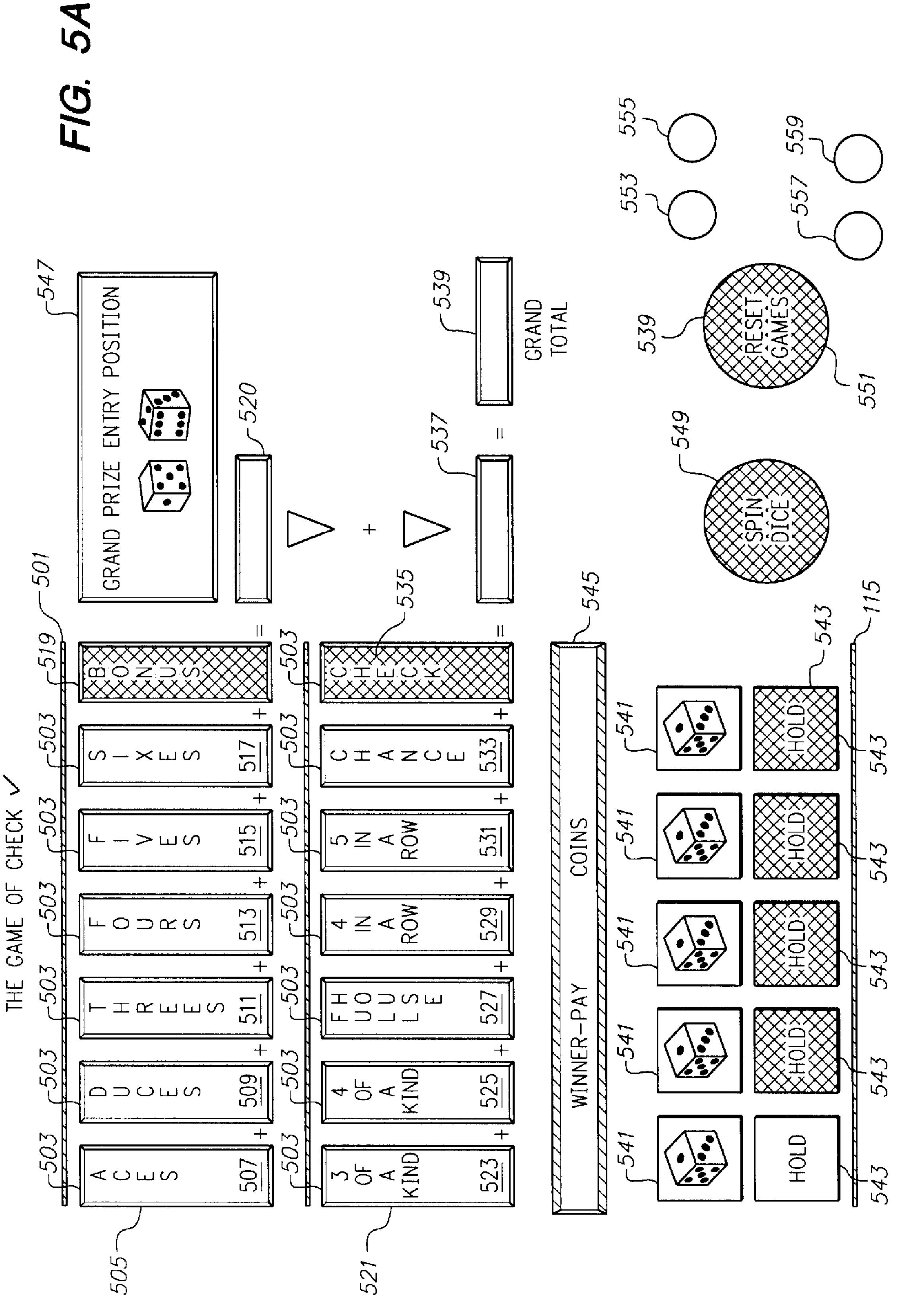
FIG. 5A is a diagram of a touch-sensitive display of a computer-controlled slot machine, in accordance with one embodiment of the gaming system of the present invention.

In a preferred embodiment of the present invention, the computer-controlled slot machine 101 includes a touch-sensitive display 115 for player input and game display. FIG. 5A illustrates the layout of the touch-sensitive display in accordance with an embodiment of the present invention for playing the game of Check. The touch-sensitive display 115 allows the player to make input selections conveniently, and displays game information in various ways, depending upon game state. The upper left area of the display 115 displays a scorecard 501 which includes thirteen dual purpose score areas 503 pertaining to the thirteen possible scoring categories. These areas are utilized to accept a player's selection of a scoring category after achieving a scoring spin, and also to display the score achieved by a player in that category, as detailed below with respect to game play.

The computer-controlled display scorecard 501 is divided into two portions. The upper portion 505 of the scorecard 501 includes dual purpose score areas 503 of the display for Ones (or Aces) 507, Twos (or Deuces) 509, Threes 511, Fours 513, Fives 515, and Sixes 517. If the player exceeds a pre-determined score threshold on the upper portion 505 of the scorecard 501, the player is awarded a bonus score which is displayed in the bonus score display area 519 of the upper portion 505 of the scorecard 501. The upper portion 505 of the scorecard 501 also includes an upper portion score total display area 520 for displaying the total of all of the scores achieved in the scoring categories of the upper portion 505 of the scorecard 501. A detailed explanation of scoring is provided below with respect to game play.

The lower portion 521 of the display scorecard 501 includes dual purpose score areas 503 for 3-of-a-Kind 523,4-of-a-Kind 525, Full House 527, a four-dice Straight 529, a five-dice Straight 531, the sum of all five dice (or Chance) 533, and 5-of-a-Kind (or Check) 535. The lower portion 521 of the scorecard 501 also includes a lower portion score total display area 537 for displaying the total of all of the scores achieved in the scoring categories of the lower portion 521 of the scorecard 501.

The display 115 includes a grand total score display area 539 which displays a player's grand total score as the sum of the upper portion score total and the lower portion score total.

The bottom left area of the display 115 includes five simulated dice 541. The bottom left area of the display 115 includes five hold buttons 543 immediately below the simulated dice 541. These hold buttons 543 are touch-sensitive areas, and are for holding a specific simulated dice 541 on a series of spins (rolls) when the player is attempting to obtain a certain combination, as detailed below with respect to game play.

The middle left area of the display 115 includes a text message box 545 for informing players of games states, such as number of spins remaining, winning combinations, game over, and for informing players of the amount of payouts.

The upper right area of the display 115 includes a message area 547 showing the position of the current scorecard 501 in the daily, weekly, monthly, or yearly prize jackpot award among multiple player networks for the prevailing scores. Alternatively, the message area 547 may show the top five scores on a multiple-player network that qualify for a jackpot, as well as the bottom five scores that so qualify, so that the player can see scores required to achieve a jackpot, as detailed below with respect to jackpots.

The bottom right area of the touch-sensitive display 115 includes a number of touch-sensitive areas which facilitate configuration and control of the game of Check. Specifically, a touch-sensitive spin button 549 activates a spin (roll) of the simulated dice 541, a touch-sensitive reset button 551 resets the scorecard 501, and a touch-sensitive start game button 553 starts a game. A touch-sensitive wager button 555 allows a player to select the number of credits to wager, a touch-sensitive game mode selection button 557 allows a player to switch between game modes, and a touch-sensitive save-restore game button 559 allows a player to save or restore a game in progress to or from a card or voucher of machine-readable medium. Of course, the various buttons or control inputs, for example 543, 549, 551, 553, 555 and 557, described herein as touch-sensitive areas on the display, 115 may also be provided as mechanical electrical input devices, as desired.

Figure 5B:
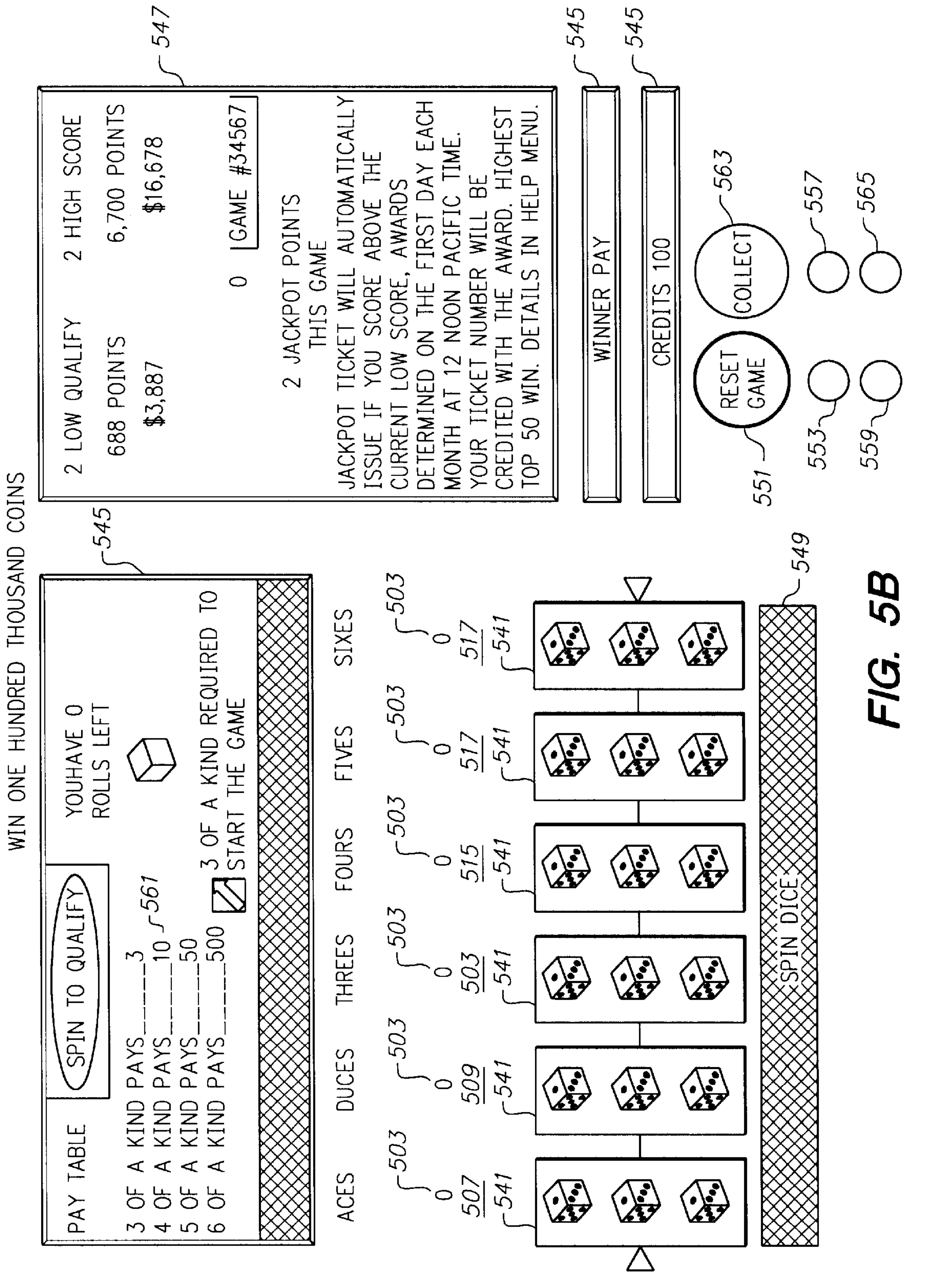
FIG. 5B is a diagram of a touch-sensitive display of a computer-controlled slot machine, in accordance with an alternative embodiment of the gaming system of the present invention.

FIG. 5B illustrates the layout of the touch-sensitive 115 display in accordance with an embodiment of the present invention for playing the game of Z Sixty Six. The touch-sensitive display 115 allows the player to make input selections conveniently, and displays game information in various ways, depending upon game state. The upper left area of the display 115 displays a paytable 561 which indicates predetermined amounts to be paid for achieving specific scoring combinations. The paytable 561 is updated as the game progresses to reflect predetermined amounts to be paid for achieving scoring combinations at different stages of game play.

Below the paytable 561 are six score areas 503 of the display 115. There is a score area for Ones (or Aces) 507, for Twos (or Deuces) 509, for Threes 511, for Fours 513, for Fives 515, and for Sixes 517. Scoring combinations are assigned to appropriate score areas 503. A detailed explanation of scoring is provided below with respect to game play.

The bottom left area of the display 115 includes six simulated dice 541. In the embodiment shown in FIG. 5B, the simulated dice are in the form of a video simulated dice reels. Below the video simulated dice 541 is a touch sensitive spin button 549 that activates a spin (roll) of the simulated dice 541. In the embodiment illustrated in FIG. 5B, the spin button 549 is in the form of one spin bar common to all simulated dice 541 on the display 115.

The upper central area of the display 115 includes a text message box 545 for informing players of games states, such as number of spins remaining, winning combinations, game over, and for informing players of the amount of payouts. The upper right area of the display 115 includes a message area 547 showing the top score on a multiple-player network that qualifies for a jackpot, as well as the bottom score that so qualifies, so that the player can see scores required to achieve a jackpot, as detailed below with respect to jackpots. Alternatively, the message area 547 may show the position of the current score in the daily, weekly, monthly, or yearly prize jackpot award among multiple player networks for the prevailing scores.

In the embodiment illustrated in FIG. 5B, a text message box 545 for informing players of payout amounts, and a text message box 545 for informing players of the number of accumulated credits are located below the message area 547.

The bottom right area of the touch-sensitive display 115 includes a number of touch-sensitive areas which facilitate configuration and control of the game of Z Sixty Six. A touch-sensitive reset button 551 resets the game, and a touch-sensitive start game button 553 starts a game. A touch-sensitive game mode selection button 557 allows a player to switch single and multiple-player game modes. A touch-sensitive save-restore game button 559 allows a player to save or restore a game in progress to or from a card or voucher of machine-readable medium. A touch-sensitive collect button 563 allows a player to collect accumulated winnings. In one embodiment, a touch-sensitive translate button 565 allows a player to select a language to be used for display output. Of course, the various buttons or control inputs, for example 551, 553, 557, and 559 described herein as touch-sensitive areas on the display 115, may also be provided as mechanical electrical input devices, as desired.

Figure 6:
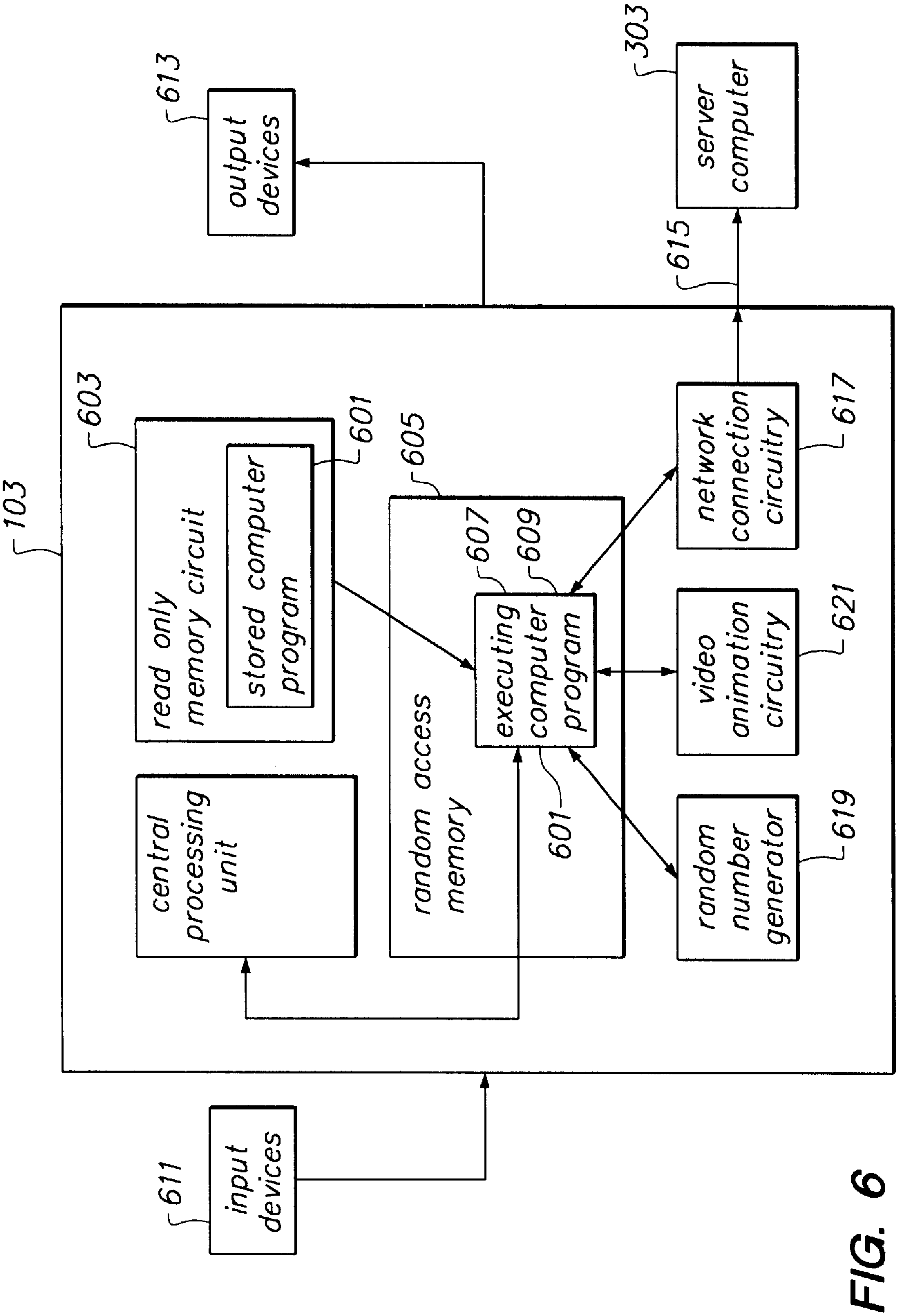
FIG. 6 is a block diagram of the microprocessor-controlled computer and the computer program which facilitate game play according to one embodiment of the present invention.

FIG. 6 illustrates the computer system that facilities game play. In a preferred embodiment of the present invention for playing the game of Check, game play is facilitated by a computer program 601 executing in the microprocessor-controlled computer 103 within the computer-controlled slot machine 101. In the preferred embodiment of the present invention, the computer program is stored on a read-only memory integrated circuit 603 that is operatively coupled to the microprocessor-controlled computer 103 in the computer-controlled slot machine 101. Of course, in alternative embodiments, the computer program may be stored on various other storage media, such as semiconductor memory or optical or magnetic disk, or the like.

The computer program 601 executes from the random access memory 605 of the microprocessor-controlled computer 103 in the computer-controlled slot machine 101, and includes code 607 and data 609 to facilitate the play of the game of Check in accordance with the game rules, as detailed below with respect to game play.

The computer program accepts user input from various user input devices 611 of the types previously described, including coin acceptor 111, bill validator 113, the touch-sensitive display 115, and the machine-readable medium reading and writing device 129. Other input devices including mechanical button type switches and lever-arm switch actuators may be used in alternative embodiments as desired.

The computer program also controls computer operation of the various output devices 613 such as the display 115, the sound speaker 117, a tower light 119, the meter 121, the coin hopper 123, the ticket printer 125, and the machine-readable medium reading and writing device 129.

Preferably, the computer program 601 also controls communication with the microprocessor-controlled server computer 303 which controls the local area computer network 301. The computer program 601 controls this communication via a network port 615 and network connectivity circuitry 617 contained within the microprocessor-controlled computer 103.

The computer program 601 utilizes a random number generator 619 to produce random numbers that represent the results of the simulated rolling of the simulated dice 541. The computer program 601 utilizes animation circuitry 621 to produce the simulation of dice on the display 115.

Figure 7:
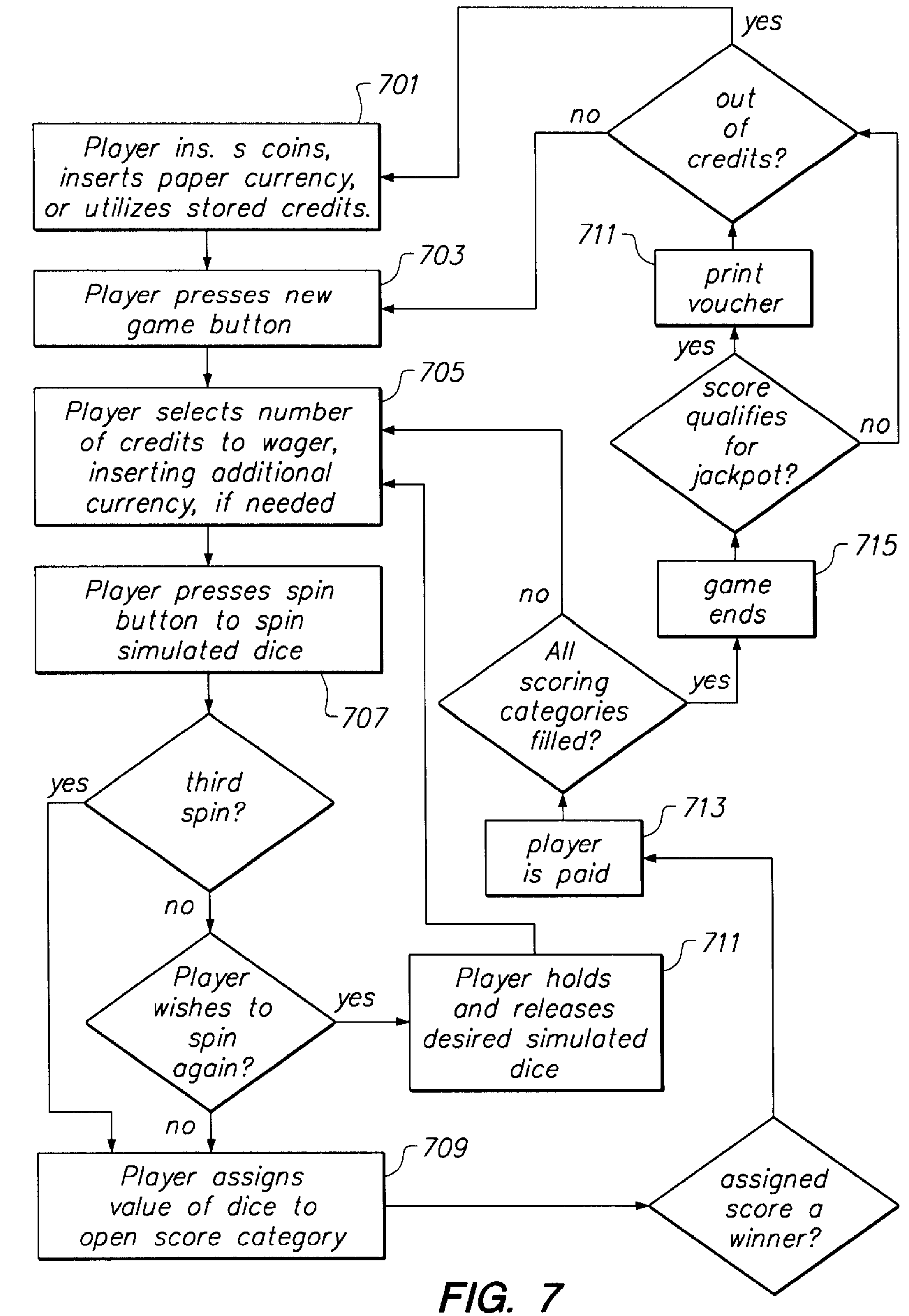
FIG. 7 is a flowchart illustrating the steps of game play according to one embodiment of the present invention.

FIG. 7 is a flowchart, illustrating play of the game of Check according to one embodiment of the present invention. The object of the game is to 'spin' the simulated dice 541 for scoring combinations, and to get the highest total score accumulated within scoring categories of possible dice combinations. A player begins by inserting 701 one or more coins into the coin acceptor 111, by inserting 701 one or more bills into the bill validator 113, or by utilizing credits. The player then presses 703 the touch-sensitive start game button 553 to begin game play. The player then selects 705 the number of credits to wager on the spin of the simulated dice 541 by utilizing the touch-sensitive wager button 555 which controls the selection of the number of credits to be wagered. The player next spins 707 the simulated dice 541 by pressing the touch-sensitive spin button 549. The computer program 601 utilizes the random number generator 619 to produce random numbers that represent the results of the simulated roll of the simulated dice 541.

On each turn, the player may spin 707 the simulated dice 541 up to three times in order to get the highest scoring combination for one of thirteen scoring categories. The thirteen scoring categories are illustrated by the following table:

| Upper Portion of Scorecard | How the Dice Score |
|---|---|
| One (or Aces) | Total of dice showing One only |
| Twos (or Deuces) | Total of dice showing Two only |
| Threes | Total of dice showing Three only |
| Fours | Total of dice showing Four only |
| Fives | Total of dice showing Five only |
| Sixes | Total of dice showing Six only |
| **Bottom Portion of Scorecard** | **How the Dice Score** |
| 3-of-a-Kind | Total of all five dice |
| 4-of-a-Kind | Total of all five dice |
| Full House (3 of one number, 2 of another number) | 25 |
| Four-Dice Straight | 30 |
| Five-Dice Straight | 40 |
| 5-of-a-Kind (or a Check) | 50 |
| Chance (any five dice) | Total of all five dice |

After each spin the player may assign 709 the value of the simulated dice 541 to one of the possible scoring categories by utilizing the dual purpose score areas 503 of the touch-sensitive display 115. If a player does so, the computer under program control senses the touched areas 503 and totals the value of the simulated dice 541 and calculates and displays the resulting score in the dual purpose score area 503 on the touch-sensitive display 115. The total score of the upper portion 505 of the scorecard 501 is displayed on the upper portion score total display area 520 on the touch-sensitive display 115. If the total score of the upper portion 505 of the scorecard 501 is 63 or higher, for example, then a bonus of 35 points, for example, is added to the upper portion score. This bonus is displayed on the bonus score display area 519 on the display 115. The total score of the lower portion 521 of the scorecard 501 is displayed on the lower portion score total display area 537 on the display 115. The grand total score is calculated by adding the upper portion and the lower portion scores together. The grand total score is displayed on the grand total score display area 539 on the display 115.

Each scoring category can only be scored or selected once during a game. Once a category is used, it cannot be reused until the next game either when the game is over because the scorecard 501 is complete or the player presses the touch-sensitive reset button 551. Pressing the touch-sensitive reset button 551 clears the entire scorecard 501 in preparation for the start of a new game.

Instead, if the player has not yet spun 707 three times during the present turn, the player may elect not to assign

709 the value of the simulated dice 541, but instead to spin 707 again. If the player elects to spin 707 again, the player may hold 711 one or more of the simulated dice 541 by pressing one or more of the associated hold button(s) 543. The player may also release 711 one or more of any held simulated dice 541 by again pressing the associated hold button(s) 543. The player may also elect not to hold or release 711 any of the simulated dice 541. The player then selects 705 the number of credits to wager on the spin of the simulated dice 541 by utilizing the touch-sensitive wager button 555. The player next spins 707 the simulated dice 541 by pressing the touch-sensitive spin button 549.

A turn is over after a player has spun 707 three times, or has assigned 709 the value of the simulated dice 541 to one of the possible scoring categories by utilizing the dual purpose score areas 503 of the touch-sensitive display 115. After a player has spun 707 three times, the player must assign 709 the value of the simulated dice 541 to one of the possible scoring categories by utilizing the dual purpose score areas 503 of the touch-sensitive display 115. If the score cannot be placed into one of the categories because it does not correspond or qualify, then the player must utilize the dual purpose score areas 503 of the touch-sensitive display to assign 709 a zero to one of the remaining categories.

If the player has achieved a scoring combination and assigns 709 it to one of the scoring categories, the player is paid 713 via the coin hopper 123. Alternatively, the player may elect to receive credits. The computer program 601 calculates payment according to a paytable, which is based upon points scored per turn, and the number of spins needed to achieve the points, as shown, for example, in the following table:

| | NUMBER OF COINS | | |
|---|---|---|---|
| CATEGORY | × 3 Spin 1 | × 2 Spin 2 | × 1 Spin 3 |
| ONES | TOTAL × 3 | TOTAL × 2 | TOTAL OF 1's |
| TWOS | TOTAL × 3 | TOTAL × 2 | TOTAL OF 2's |
| THREES | TOTAL × 3 | TOTAL × 2 | TOTAL OF 3's |
| FOURS | TOTAL × 3 | TOTAL × 2 | TOTAL OF 4's |
| FIVES | TOTAL × 3 | TOTAL × 2 | TOTAL OF 5's |
| SIXES | TOTAL × 3 | TOTAL × 2 | TOTAL OF 6's |
| 3 of a Kind | TOTAL × 3 | TOTAL × 2 | TOTAL × 1 |
| 4 of a Kind | TOTAL × 3 | TOTAL × 2 | TOTAL × 1 |
| Full House | 75 | 50 | 25 |
| Small Straight | 90 | 60 | 30 |
| Large Straight | 120 | 80 | 40 |
| Chance | TOTAL × 3 | TOTAL × 2 | TOTAL × 1 |
| Check | 150 | 100 | 50 |
| Check Bonus 1 | 300 | 250 | 100 |
| Check Bonus 2 | 300 | 200 | 100 |
| Check Bonus 3 | 300 | 200 | 100 |

| SCORECARD BONUSES | |
|---|---|
| TOP HALF 63+ POINTS | +35 COINS |
| ALL CATEGORIES FILLED | +100 COINS |
| SCORE 250–299 PTS. | +50 COINS |
| SCORE 300–349 PTS. | +100 COINS |
| SCORE 350–399 PTS. | +150 COINS |
| SCORE 400–449 PTS. | +200 COINS |
| SCORE 450–499 PTS. | +250 COINS |
| SCORE 500–549 PTS. | +300 COINS |
| SCORE 550–599 PTS. | +350 COINS |
| SCORE 600–644 PTS. | +400 COINS |
| PERFECT SCORE | +6000 COINS |

If the player assigns 709 a zero score to one of the categories, the player is not paid. Alternative embodiments may employ different paytables, as desired.

The player may then proceed with the next turn and continue filling the scorecard 501. To proceed with the next turn, the player utilizes the touch-sensitive wager button 555 to select 705 the number of credits to be wagered on the spin of the simulated dice. The player next spins 707 the simulated dice 541 by pressing the touch-sensitive spin button 549 and plays a turn, as described above. The game ends 715 when the player has filled all thirteen categories with a score or a zero or is out of credits to play the computer-controlled slot machine 101.

Once the game has ended, the computer program 601 evaluates the player's scorecard 501 against other current scores to determine if a progressive jackpot will be awarded on a daily, weekly, monthly, or yearly basis. If the player has a currently qualifying scorecard 501, the computer-controlled slot machine 101 prints 717 a voucher for the player with a control number and other pertinent information for later redemption, if the scorecard 501 is a winner.

Utilizing a local area computer network 301 and a wide area computer network 401, multiple players may play the game of Check against one another instead of "against the house." Utilizing a local area computer network 301, each participating player deposits money into an individual computer-controlled slot machine 101 for each spin. The player who achieves the highest scorecard 501 of all of the players who are participating in that multiple player game on the local area computer network 301 wins the money deposited by the various participating players (typically, minus a percentage for the house). The same methodology can be utilized across a wide area computer network 401, allowing players at different physical locations to compete against each other in real time.

Figure 8:
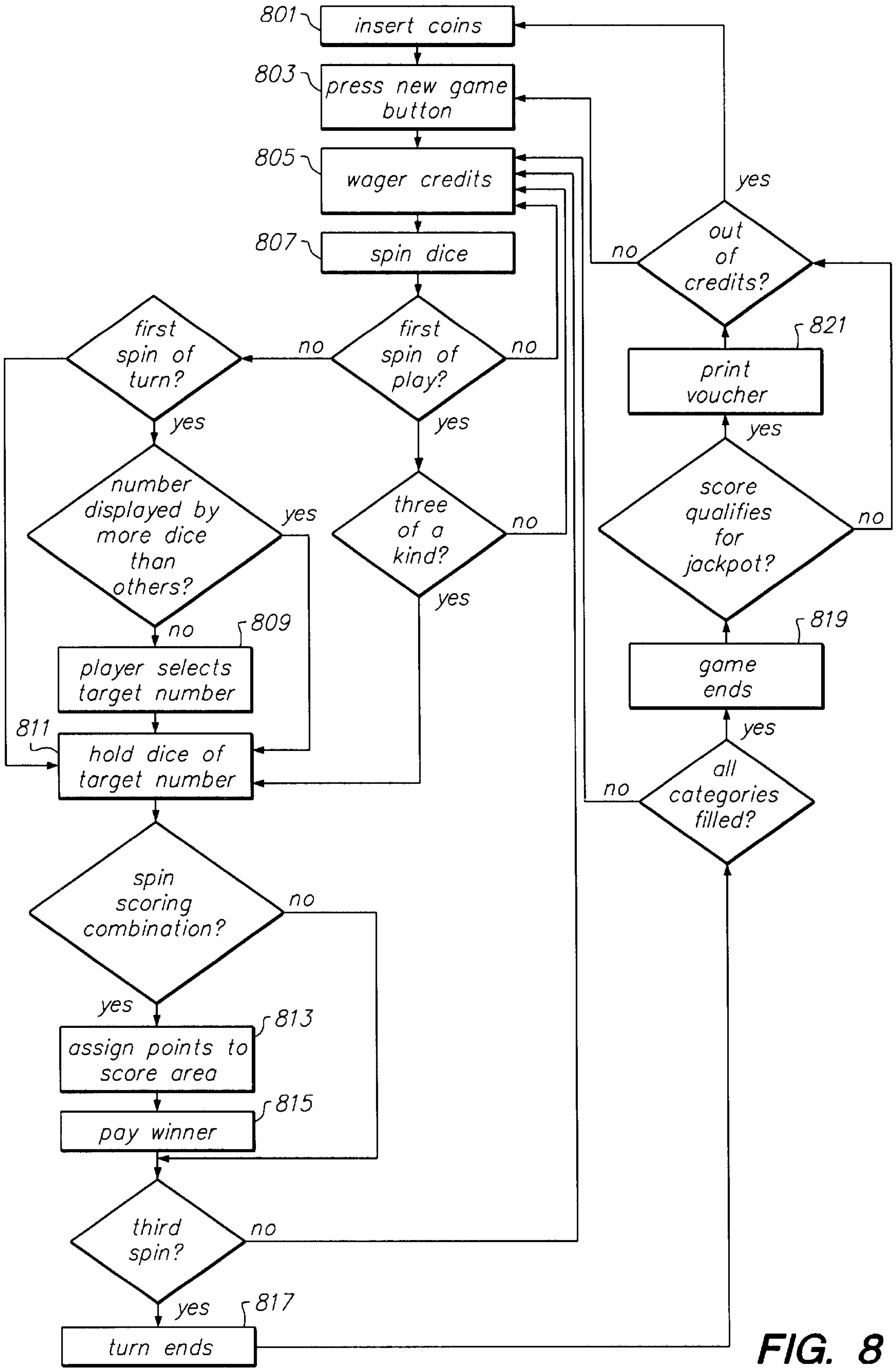
FIG. 8 is a flowchart illustrating the steps of game play according to an alternative embodiment of the present invention.

FIG. 8 is a flowchart, illustrating play of the game of Z Sixty Six according to one embodiment of the present invention. The object of the game is to 'spin' the simulated dice 541 for scoring combinations, and to get the highest total score accumulated within scoring categories of possible dice combinations. A player begins by inserting 801 one or more coins into the coin acceptor 111, by inserting 801 one or more bills into the bill validator 113, or by utilizing credits. The player then presses 803 the touch-sensitive start game button 553 to begin game play. In one embodiment, three credits are automatically wagered 805 on each spin of the simulated dice 541. In another embodiment, the player selects the number of credits to wager on the spin of the simulated dice 541 by utilizing the touch-sensitive wager button 555 which controls the selection of the number of credits to be wagered. The player next spins 807 the simulated dice 541 by pressing the touch-sensitive spin button 549. The computer program 601 utilizes the random number generator 619 to produce random numbers that represent the results of the simulated roll of the simulated dice 541.

The player must achieve at least three of a kind on a single spin to begin play of an individual game. Until a spin generates at least three simulated dice 541 displaying identical numbers, the player must continue spinning 807 to attempt to generate the minimum achievement required for game entry. A wager is required for each spin of the simulated dice 541. Once a spin generates at least three simulated dice 541 displaying identical numbers, those simulated dice 541 are automatically held 811, and a predetermined number of points is automatically assigned 813 to the appropriate scoring area 503. The number of points awarded is displayed in the appropriate score area 503, which preferably changes color to indicate active status. The spin that generated the requisite achievement is counted as the first spin of a turn, and the scoring number becomes a target number for the remainder of the turn. A target number is a number that the player can receive points for generating during a give turn.

For example, if a first spin results in four aces (ones), the predetermined number of points for achieving four of a kind on the first spin of a first turn is automatically assigned 813 to the scoring area 503 for aces 507. Aces becomes the target number for the remainder of the turn. Thus, on the subsequent spins of the turn, the player will receive additional points only for generating aces.

The requirement of generating at least three of a kind applies only to the first turn. A player must achieve three of a kind to enter the game and begin the first turn. Once a player has generated the requisite achievement and entered the game, subsequent turns do not require a minimum achievement to begin.

On each turn, the player may spin 807 the simulated dice 541 up to three times in order to get the highest scoring combination for one of six scoring categories. The six scoring categories are illustrated by the following table:

| Score Category | How the Dice Score |
|---|---|
| One (or Aces) | Dice showing One only |
| Twos (or Deuces) | Dice showing Two only |
| Threes | Dice showing Three only |
| Fours | Dice showing Four only |
| Fives | Dice showing Five only |
| Sixes | Dice showing Six only |

After the first spin of a turn, the number displayed by the largest plurality of the video simulated dice 541 automatically becomes the target number for the current turn. The simulated dice 541 of the target number are automatically held 811, and the score area 503 for the target number preferably changes color to indicate that it is the active score area 503 for the turn. If at least three dice 541 displaying the target number have been generated, a predetermined number of points is assigned 813 to the score area 503 for the target number.

If the first spin does not result in a largest plurality of dice 541 displaying any one number, the player selects 809 a target number from amongst those displayed by an equal number of the simulated dice 541. For example, if the first spin results in two aces, two deuces, one four and one five, the player may select 809 acres or deuces as the target number. The selection is made by touching the desired score area 503 of the touch-sensitive display 115. Preferably, the score areas 503 which the player may touch to choose a target number blink or change color or size or otherwise provide visual indication of the choices available.

If the player has not yet spun 807 three times during the present turn, the player may spin 807 again. The player next spins 807 the simulated dice 541 by pressing the touch-sensitive spin button 549. During the second and third spins of a turn, any generated dice 541 displaying the target number are held 811. Preselected numbers of points are assigned 813 to the appropriate scoring area 503 for scoring three, four, five, or six of the target number.

After each spin, if the player has achieved a scoring combination, the player is paid 815 via the coin hopper 123. Alternatively, the player may elect to receive credits. The number of predetermined points awarded for various scoring achievements is displayed in a paytable 545 on the display 115. The paytable 545 is adjusted as the game progress, reflecting predetermined numbers of points to be paid for various achievements at a particular stage of the game. For example, more points are awarded for achieving a six of a kind on a first spin than on a third spin. Amounts to be paid are based upon the odds of achieving various scoring combinations at a given stage of game play, taking into account number of unheld dice to be spun, and numbers removed from possible generation. An example of paytable 545 for a first spin of a game appears below.

| ACHIEVEMENT | NUMBER OF POINTS TO BE PAID |
|---|---|
| THREE OF A KIND | 3 |
| FOUR OF A KIND | 10 |
| FIVE OF A KIND | 50 |
| SIX OF A KIND | 500 |

Alternative embodiments may employ different paytables 545, as desired.

A turn ends 817 after a player has spun 807 three times, or achieved six of the target number prior to the third spin.

Each scoring category can only be scored or selected once during a game. Once a category is used, it cannot be reused until the next game either when the game is over because a score has been assigned to each category, or the player presses the touch-sensitive reset button 551. Pressing the touch-sensitive reset button 551 terminates the current game and starts a new game. Once a scoring category for a given number has been used, that number is replaced for the remainder of the game by a non-numerical symbol, for example the letter "Z" or a graphic symbol of a piece of fruit, or as desired. During subsequent turns, when the random number generator 619 generates the used number, the non-numerical symbol is displayed instead.

After completing a turn, the player may then proceed with the next turn and continue filling the score areas 503. To proceed with the next turn, the player next spins 707 the simulated dice 541 by pressing the touch-sensitive spin button 549 and plays a turn, as described above.

The game ends 819 when the player has filled all six score areas 503 with a score, or is out of credits to play the computer-controlled slot machine 101.

Figure 9:
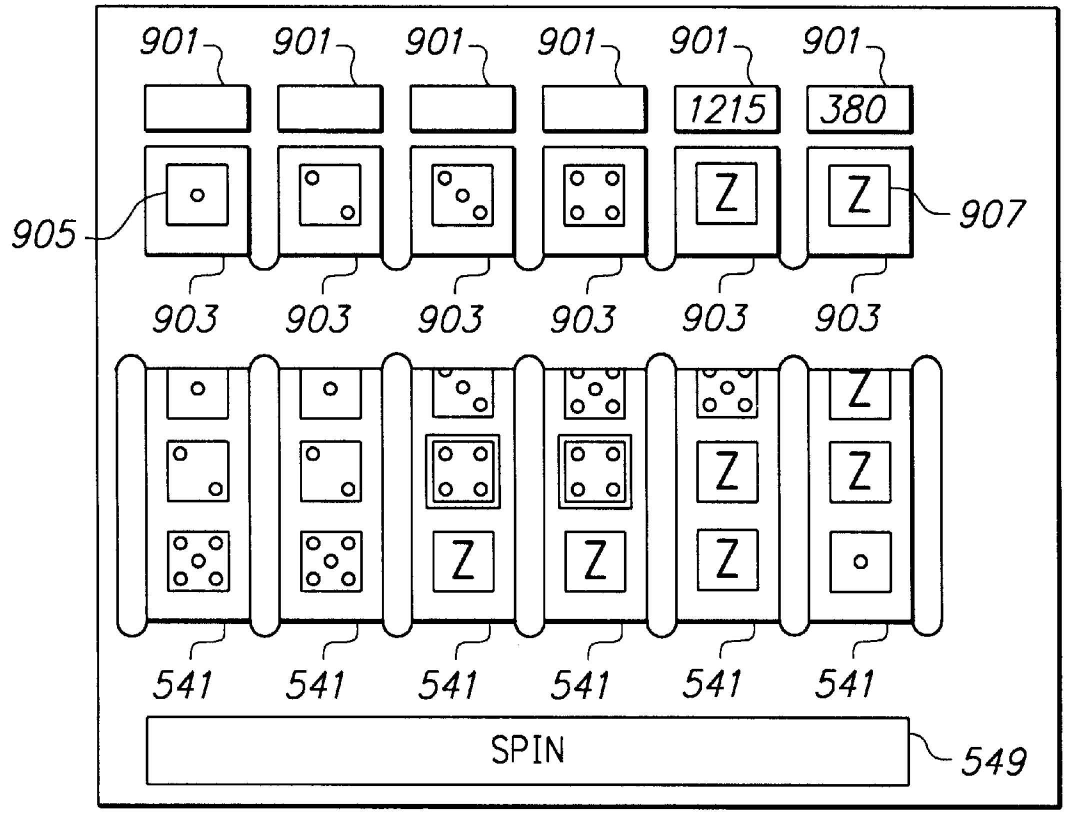
FIG. 9 is illustrates score categories comprising two distinct display areas, according to one embodiment of the present invention.

FIG. 9 illustrates an embodiment of the present invention in which each score area 503 comprises two distinct display areas. A first display area 901 is utilized to display accumulation of points for the associated scoring category. A second display area 903 identifies the associated scoring category, for example by displaying an identification video simulated dice 905 displaying the number of the scoring category. Additionally, the second display area 903 is used to indicate a current target number for a turn, preferably by changing color to indicate that the number of the associated scoring category is the active target number. Also, the second display area 903 is preferably utilized to choose a target number from amongst those displayed by an equal number of the simulated dice 541 when necessary. The player chooses a target number by touching the second display areas 903 associated with the chosen target number. The second display area 903 which the player may touch to choose a target number blink or change color or size or otherwise provide visual indication of the choices available. Additionally, once a scoring category for a given number has been filled, the indicator for the associated second display area is replaced for the remainder of the game by a non-numerical symbol 907, for example the letter "Z" or a graphic symbol of a piece of fruit, or as desired.

In alternative embodiments, display of accumulated points, identification of score category, indication of current target number, indication of available choices of target number, and indication of filled categories (and in other embodiments more or fewer functions as desire) are divided between at least two display areas, in various combinations as desired.

Once the game has ended, the computer program 601 evaluates the player's score against other current scores to determine if a progressive jackpot will be awarded on a daily, weekly, monthly, or yearly basis. If the player has a currently qualifying score, the computer-controlled slot machine 101 prints 821 a voucher for the player with a control number and other pertinent information for later redemption, if the score is a winner. In various embodiments, jackpots are awarded for achieving high scores, for achieving high scores low scores, or for achieving both high and low scores as desired.

Another embodiment of a game of the present invention will be described with reference primarily to FIGS. 10–11. This game is referred to herein as the game of Z Hot Dice.

Figure 10:
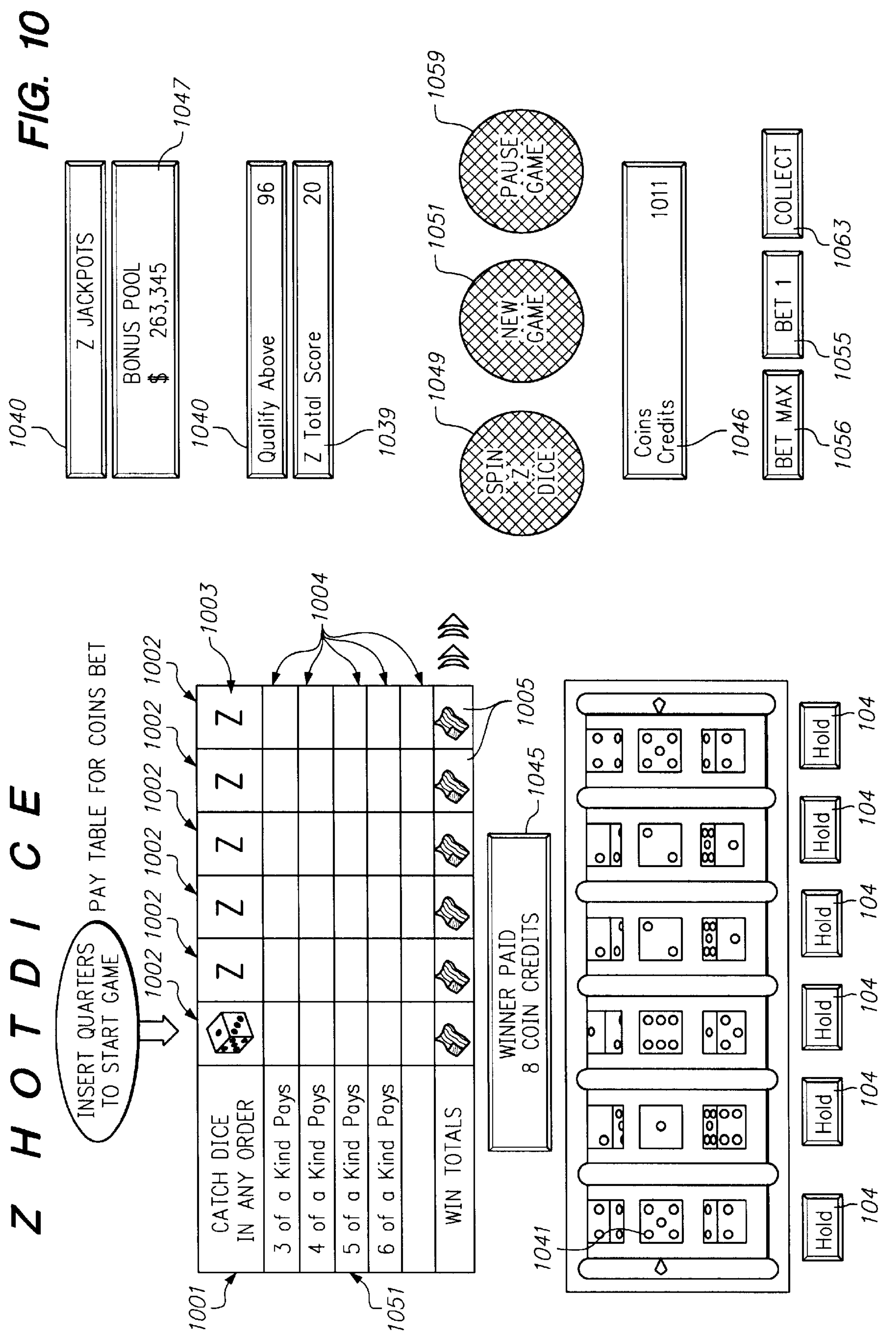
FIG. 10 illustrates a user-interface for an alternate game of the present invention.
Figure 11:
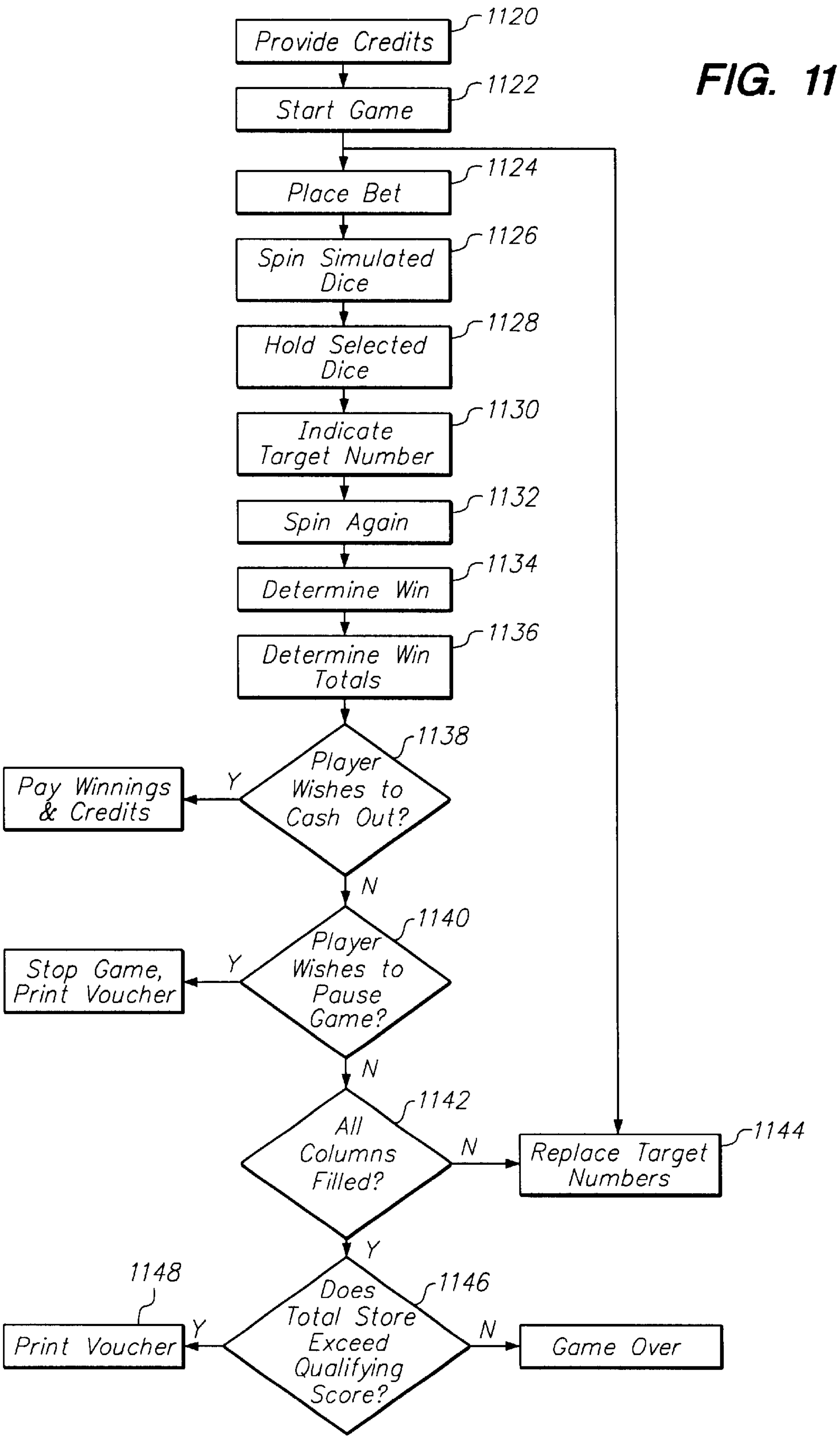
FIG. 11 is a flowchart illustrating the steps of game play of the game having the interface illustrated in FIG. 10.

FIG. 10 illustrates a touch sensitive display 1015 for implementing the game of Z Hot Dice. A scorecard 1001 area is provided in an upper left-hand corner. The scorecard 1001 displays information regarding a particular event, the pay table for that event, prior played events, and win totals for each prior played event and the current event.

The scorecard 1001 includes six columns 1002, the number of columns being the same as the number of sides of dice. During game play, as described below, a target number is associated with one of the columns 1002, the target numbers comprising one of the numbers associated with a side of a dice (i.e. the numbers one through six). At a top of each column 1002 is provided a target number indicator 1003. In one embodiment, before a target number has been selected, this indicator 1003 displays a "Z" or other symbol (or nothing). A central portion 1004 of each column 1002 indicates the payout which will be awarded to a player for receiving a particular combination of the target number(s).

In the embodiment illustrated, the central portion 1004 is arranged to display payouts for receiving 3 of a Kind, 4 of a Kind, 5 of a Kind or Six of a Kind of the target number. A win total 1005 is provided at the bottom of each column 1002 for indicating the total payout or winnings to the player for a particular event. Those of skill in the art will appreciate that other winning combinations may be provided, such as a full house (i.e. three of the target number along with two of another number).

The display 1015 displays a number of simulated dice 1041, in a similar manner to that described above. Below each simulated dice area 1041 is a hold button 1043. Each button 1043 is associated with one of the simulated dice 1041 and, as described in more detail below, arranged to permit a player to "hold" the a particular simulated dice 1041 in a fixed position.

A number of other display areas are provided for displaying game information. For example, a message area 1047 is provided for displaying the amount of winnings in a jackpot pool. A grand total area 1039 is provided for indicating to the player their total score for the win totals 1005 of all columns 1002. In addition, a qualify score 1040 is displayed so that the player may determine if his or her grant total is sufficiently high to qualify for a bonus or jackpot (as described below).

A new game button 1051 is provided for permitting a player to begin a new game. As described in more detail below, once a player has placed a wager, a text messages area 1045 displays winnings paid or other information for a player. The player may bet or wager credits in single increments with a "Bet 1" button 1055, or may bet or wager a maximum allowed number of credits using a "Bet Max" button 1056. A credits area 1046 displays the credits belonging to the player.

A spin button 1049 is provided for permitting a player to effectuate a spin of the simulated dice 1041. A pause game button 1059 is provided for permitting a player to pause a game in progress. A player may elect to cash out by pressing a collect button 1063.

As described in more detail below, while in one arrangement the user interface or screen comprises a touch screen arranged to display information to a player and receive input therefrom, the user interface may comprise a combination of electrical and mechanical devices. For example, one or more of the buttons may comprise electromechanical buttons which may be depressed by a player. Those of skill in the art will appreciate that many players like the "tactile" feel of buttons as compared to touch screen input. Further, while the display areas are discussed separately, they may be integrated or be arranged in a number of ways other than as shown.

A method of play of the game of Z Hot Dice will be described with reference to FIG. 11. In a first step 1120, a player inserts a number of coins or provides other consideration for playing the game. The consideration may be dollar bills, credits from a player card or the like.

In a step 1122, the player presses the new game button 1051 to initiate a new game. In one or more embodiments, the gaming apparatus is configured such that if the player presses the new game at any time during the pendency of a game, the player is prompted to press the new game button again if the player actually intends to start a new game. This serves to reduce the likelihood that the player may accidentally or unintentionally press the new game button 1051 and cause a new game to begin. The prompt message may be illuminated in the text message box 1045.

In a step 1124, the player places a wager or bet. In one embodiment, this step comprises the player pressing the "Bet 1" button 1055 or the "Bet Max" button 1056. In one embodiment, a player is permitted to bet between one and five credits. Each credit may comprise any of a number of values, such as $0.05 U.S., $0.10 U.S., $0.25 U.S. or the like. The player may utilize the "Bet 1" button 1055 to place wagers incrementally, or press the "Bet Max" button 1056 to place a maximum bet. The payouts displayed on the central portions 1004 of the columns 1002 may be updated, as necessary, to reflect an increased payout for achieving a predetermined winning combination when the player increases the amount wagered.

In a step 1126 the player presses the spin button 1049. Upon depressing the spin button 1049, the simulated dice 1041 spin or move (such as in a motion simulating a "reel" displaying die faces), and then stop, as described above to simulate the random roll of dice.

At this point, six simulated die 1041 are displayed to the player, each dice 1041 displaying one face, and thus one number, towards the player. In the arrangement illustrated in FIG. 10, the simulated die 1041 display a five, a one, a six, a two, another two, and another five.

In a step 1128, the player is then permitted to "hold" the dice which that player wishes to play. The held dice identify a selected target number, the target number being that number shown on the face of the held dice. For example, in the arrangement illustrated in FIG. 10, the player may elect to hold the simulated die 1041 displaying fives. In such event, the player presses the right-most and left-most buttons 1043, and the target number then comprises five.

In a step 1130, when the player makes a selection, the target number is displayed in the first available column 1002 of the scorecard 1001. In one embodiment, the first available column comprises the left-most column 1002 which has not been utilized during the game. Preferably, the target number is illustrated by replacing the "Z" or other symbol in the indicator 1003 with a dice displaying the target number. In the example given above, a dice displaying a five would be displayed in the left-most column 1002.

In one or more embodiments, a player is not permitted to select as a target number a number which has already been played in a particular game. If the player attempts to do so, a message may be displayed in the text message box 1045 to the effect that the selected number has already been played and the player must either select a new target number or spin again. Another spin may be required where the first spin does not result in the display of any available target numbers (as described below, after a target number has been played, it is preferably removed from the simulated die 1041 and will not be re-displayed). In addition, if the player selects more than one number (such as a simulated dice 1041 displaying a five and another displaying a two) the player be instructed that the action is not permitted and the player must select only one target number.

Preferably, when a number is selected, the particular column 1002 is highlighted, such as in brightness or a different color, to aid the user in identifying which information is pertinent to the present round of the game.

In one or more embodiments, the particular payout is dependent upon the player's wager, with the payout increasing with an increasing wager. Set forth below are possible paytables for wagers of one, two, three, four and five coins or bet increments for each target number. As will be appreciated, the payout increases as the number of target numbers played increases (for reasons described below). Of course, a variety of payouts may be different than those illustrated.

| | First Target Number | Second Target Number | Third Target Number | Fourth Target Number | Fifth Target Number | Sixth Target Number |
|---|---|---|---|---|---|---|
| | | | For 1 coin bet: | | | |
| 3 of a Kind | 1 | 2 | 3 | 4 | 5 | 6 |
| 4 of a Kind | 3 | 4 | 5 | 8 | 11 | 33 |
| 5 of a Kind | 30 | 40 | 50 | 80 | 110 | 330 |
| 6 of a Kind | 300 | 400 | 500 | 800 | 1100 | 3300 |
| | | | For 2 coins bet: | | | |
| 3 of a Kind | 2 | 4 | 6 | 8 | 10 | 12 |
| 4 of a Kind | 6 | 8 | 10 | 16 | 22 | 66 |
| 5 of a Kind | 60 | 80 | 100 | 160 | 220 | 660 |
| 6 of a Kind | 600 | 800 | 1000 | 1600 | 2200 | 6600 |
| | | | For 3 coins bet: | | | |
| 3 of a Kind | 3 | 6 | 9 | 12 | 15 | 18 |
| 4 of a Kind | 9 | 12 | 15 | 24 | 33 | 99 |
| 5 of a Kind | 90 | 120 | 150 | 240 | 330 | 990 |
| 6 of a Kind | 900 | 1200 | 1500 | 2400 | 3300 | 9900 |
| | | | For 4 coins bet: | | | |
| 3 of a Kind | 4 | 8 | 12 | 16 | 20 | 24 |
| 4 of a Kind | 12 | 16 | 20 | 32 | 44 | 132 |
| 5 of a Kind | 120 | 160 | 200 | 320 | 440 | 1320 |
| 6 of a Kind | 1200 | 1600 | 2000 | 3200 | 4400 | 13200 |
| | | | For 5 coins bet: | | | |
| 3 of a Kind | 1 | 10 | 15 | 20 | 25 | 30 |
| 4 of a Kind | 15 | 20 | 25 | 40 | 55 | 165 |

-continued

| | First Target Number | Second Target Number | Third Target Number | Fourth Target Number | Fifth Target Number | Sixth Target Number |
|---|---|---|---|---|---|---|
| 5 of a Kind | 150 | 200 | 250 | 400 | 550 | 1650 |
| 6 of a Kind | 1500 | 2000 | 2500 | 4000 | 5500 | 16500 |

If after the first spin and hold, the player has a winning combination of simulated dice 1041, then the win total is indicated in the win total area 1005 of the scorecard 1001, and the text message box 1045 may indicate the winnings. For example, in the event upon the first spin of the game the spin results in four simulated dice 1041 showing a five, then the player may hold these four simulated dice for a "4 of a Kind" of a target number of fives. The payout for this combination may then be indicated in the win total area for the first column 1002, and the text message box 1045 indicate the winnings to be paid.

In one embodiment, payouts for combinations of target numbers which are eliminated may be removed from the scorecard 1001. For example, in the above-referenced example, the payout for a 3 of a Kind may be removed from the first column 1002, since the player has already received at least a 4 of a Kind. In addition, the payout which the player has already received upon the first spin for that target number may be highlighted to bring to the attention of the player that he or she has already won. This highlighting may be by displaying the payout in a distinguishing color or brightness or other means available. The word "paid" may be indicated in the particular area of the scorecard 1001 as well.

In accordance with the present invention, in a step 1132, after holding one or more of the simulated dice 1041, or after an indication that no dice can be held, then the player presses the spin button 1049 again. All of the simulated dice 1041 which were not held spin and then stop, again displaying a number.

In a step 1134, the total number of simulated dice 1041 displaying the target number after the second spin are then counted for determining whether a payout is to be awarded. A win total is displayed in the win total area 1005 of the particular column. This win total may be 0, in the event the player did not receive a sufficiently high number of simulated dice 1041 displaying the target number (for example, a player may elect to hold two dice showing the target number after the first spin and not receive any additional dice showing the target number after the second spin, thus not receiving a minimum three of the target number for an award). The payout for that "round" may then be updated in the text message box 1045.

In a step 1136, the win totals from all win total areas 1005 are summed and displayed as a total score in the total score area 1039. Preferably, a qualifying score for a jackpot bonus is displayed in the qualifying score area 1040, again which the player may compare their score.

In a step 1138 it is determined if the player wishes to cash out. This is indicated by a player pressing the collect button 963. In such event, any accumulated winnings and credits are paid to the player. In that event, the game ends.

In a step 1140, it is determined if the player wishes to pause the game. If the player wishes to pause the game, the player pushes the pause game button 1059. A process is then initiated by which the player may leave the game and being play at a later time and even at different gaming machine, as described in more detail below.

If the player wishes to continue the game, it is determined in a step 1142 if all of the columns 1002 of the scorecard 1001 are filled. If so, then the player has completed the game. In a step 1146, the player's total score is compared to the qualifying score to determine if the player qualifies for participation in the jackpot. If the player qualifies, then in a step 1148, the player is provided with a voucher or the like, in similar manner to that described above with respect to the game of Z Sixty Six.

In a step 1144, after a particular target number has been played in a round, that target number is replaced on each simulated dice 1041 with another symbol or is removed. As described above, this may be a symbol, such as a "Z," or a picture of a fruit or the like. In one embodiment, it is preferred that the replacement symbols be different so that at no time can a player receive a sequence of the same symbols during a spin. Such may be confusing to a player and lead a player into believing that they have spun into a winning combination. For example, the replacement symbols may comprise an X on the first simulated dice 1041, an O on the second simulated dice 1041, an X on the third simulated dice 1041 and so on, so that if a player spins and the simulated dice stop on the replacement symbols, they display XOXOX.

In another embodiment, the replacement symbols may actually be arranged so that a player may spin into a new bonus combination for which a payout is awarded. For example, each number or dice face may be replaced with a $ symbol, such that during later play if the player receives a display of all of these symbols after a spin, the player is awarded a special prize or payout.

If all of the columns 1002 of the scorecard 1001 are not filled, the player may, repeating again to step 1124, place a bet or wager. The player may be provided with an indication in the text message box 945 after a given round that they may place a bet to continue with the game.

The game then continues as described above. It will be appreciated that after a first target number has been played, a spin of the simulated dice 1041 may result in a display of all of the remaining numbers and/or the symbols used to replace the already played target number. As the number of played numbers increases, the probability of receiving a target number decreases. For this reason, as detailed above, the payout for receiving a winning combination of each target number increases as the game progresses.

The player may continue playing until each of the target numbers one through six, have been played (in any order). At such time, the total score for the player is compared to the qualifying score to determine if the player is entitled to participate in a jackpot or additional play. Regardless of the outcome, the player must then begin a new game to continue play.

Another embodiment of a game of the present invention will be described with reference primarily to FIGS. 12–13. This game is referred to herein as the game of Z Jackpot Dice.

Figure 12:
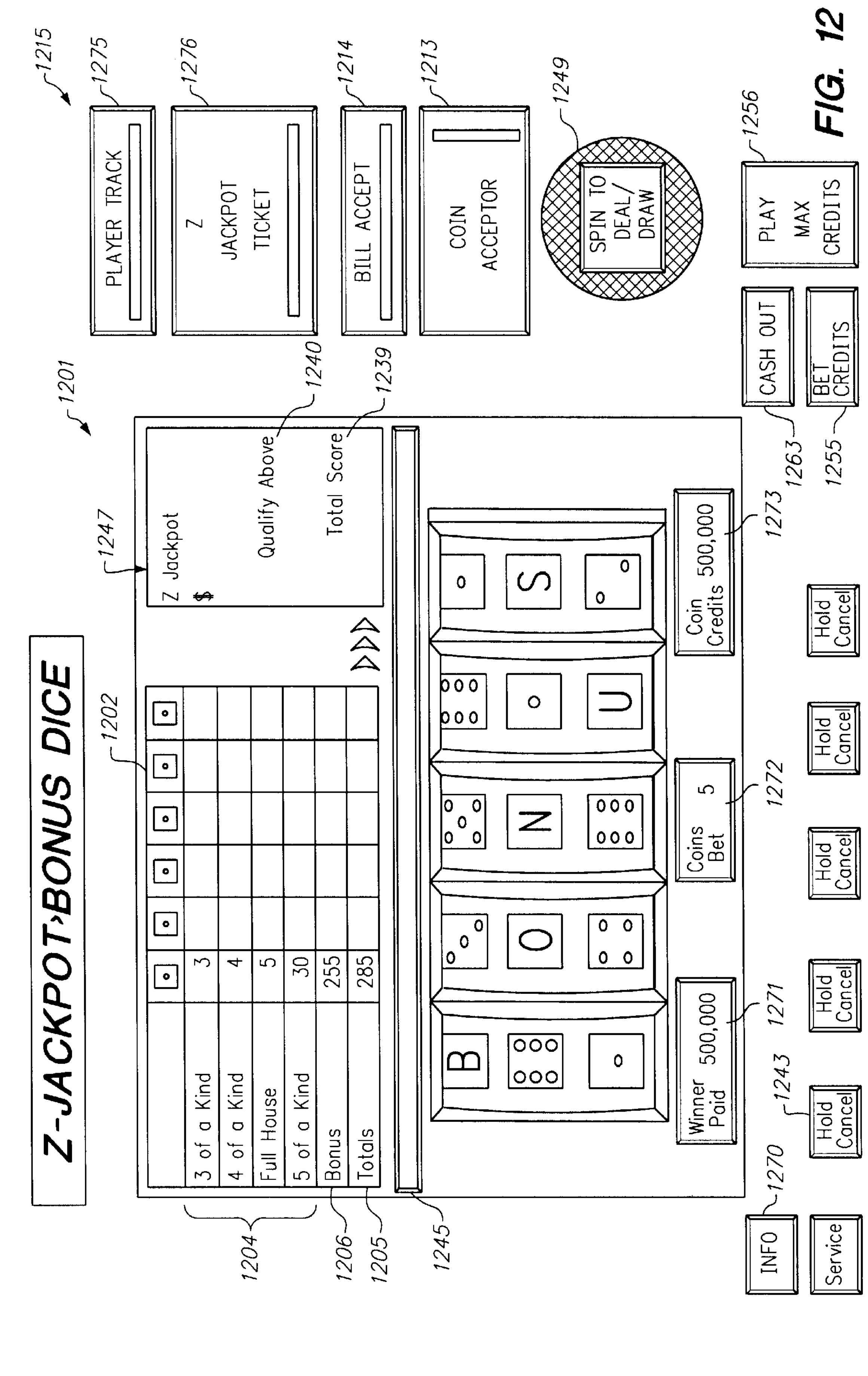
FIG. 12 illustrates a user-interface for an alternate game of the present invention.
Figure 13:
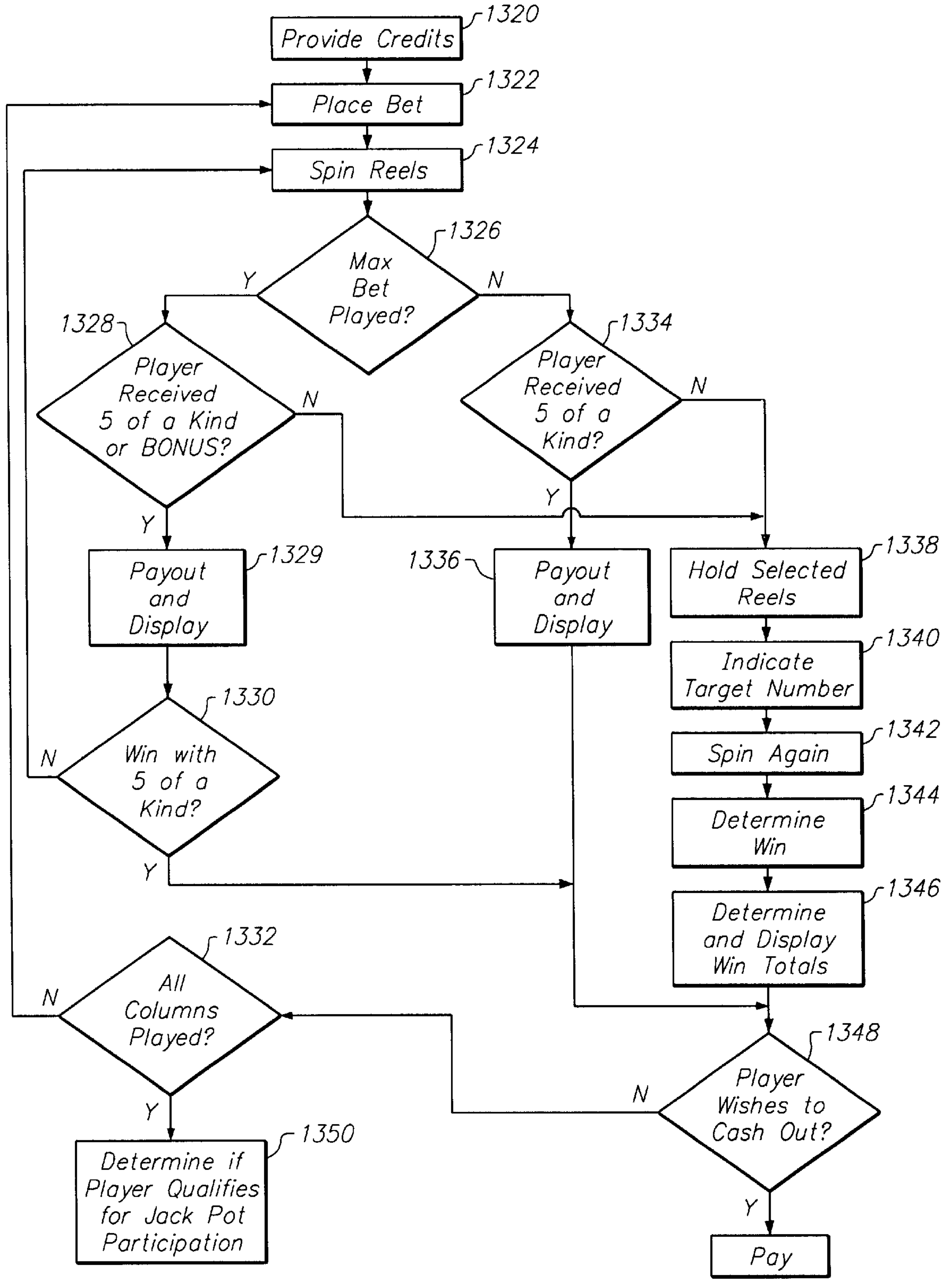
FIG. 13 is a flowchart illustrating the steps of game play of the game having the interface illustrated in FIG. 12.

FIG. 12 illustrates an interface 1215 for implementing the game of Z Jackpot Dice. A scorecard 1201 area is provided in an upper left-hand corner. The scorecard 1201 displays information regarding a particular play event, the pay table for that event, prior played events, and win totals for each prior played event and the current event.

The scorecard 1201 is similar to that of the previous embodiment in many respects, and includes six columns 1202, one for each of the six sides of a dice and the numbers associated therewith. At a top of each column 1202 is provided a target number indicator 1203. In one embodiment, before a target number has been selected, this indicator 1203 comprises a blank dice. A central portion 1204 of each column 1202 indicates the payout for a particular combinations of the target number and/or other numbers. As illustrated, the central portion 1204 is arranged to display payouts for receiving 3 of a Kind, 4 of a Kind, and 5 of a Kind of the target number, as well as a full house, a full house comprising three of the target number and a pair of another number. Preferably, the payouts for all combinations are illustrated in the central portion 1204, regardless of whether a particular column 1202 is active (as described below). However, it is desired that the payout information for the non-active column to be displayed less brightly or less visibly than the information provided in the active column. In this manner, a player is provided with information regarding the possible payouts for receiving combinations in any particular column, but the player's attention is directed to the active column 1202 so as to avoid the player being confused as to which column 1202 is being played.

A bonus value 1206 is provided in the column 1202. The bonus value 1206 comprises a payout value which the player may win in a manner described in more detail below. In a preferred embodiment, the bonus value 1206 comprises a sum which is related to the amount of wagers placed by players when playing the game, such as a percentage of the wagers or retained winnings by the game provider/house.

A win total 1205 is provided at the bottom of each column 1202 for indicating the total payout or winnings to the player for a particular event.

The interface 1215 also includes a number of reels 1241. In the preferred embodiment of this game, five reels 1241 are provided. In a preferred embodiment, each reel 1241 is capable of displaying one of nine symbols: one symbol each comprising a side of a dice, and three symbols comprising a letter in three different colors. Thus, each reel 1241 is capable of displaying dice sides having a one, two, three, four, five and six thereon. The first reel is preferably arranged to display the letter "B" in the colors of red, white and blue. The second reel is preferably arranged to display the letter "O" in the colors of red, white and blue. The third reel is preferably arranged to display the letter "N" in the colors of red, white and blue. The fourth reel is preferably arranged to display the letter "U" in the colors of red, white and blue. The fifth reel is preferably arranged to display the letter "S" in the colors of red, white and blue.

It will be appreciated that the reels 1241 may comprise a displayed image on a video display. In one or more other embodiments, the reels 1241 may comprise mechanical reels having one or more of the images printed thereon and/or capable of being displayed thereon. In general, each reel 1241 is arranged to simulate a throw or spin of an imaginary nine-side dice having sides displaying the above-described numbers and symbols. Thus, as one aspect of the invention, dice or similar physical items are represented either graphically or on a physical reel.

Below each reel 1241 is a hold button 1243. Each button 1243 is associated with one of the reels 1241 and, as described in more detail below, arranged to permit a player to "hold" the position of a particular reel 1241 in a fixed position.

A number display areas are provided for displaying related game information. For example, a message area 1247 is provided for displaying the amount of winnings in a jackpot pool. A grand total area 1239 is provided for indicating to the player the total score of the win totals 1205 of all columns 1202. In addition, a qualify score 1240 is displayed so that the player may determined if his or her grant total is sufficiently high to qualify for a bonus or jackpot (as described below).

A new game button 1251 is provided for permitting a player to begin a new game. As described in more detail below, once a player has placed a wager, a text messages area 1245 may be used to display information, such as game play information. The game play information may be accessible by pressing an information button 1270.

Display areas are provided for displaying winner paid information 1271, bet information 1272, and credit information 1273. The player may bet or wager credits in single increments with a "Bet 1" button 1255, or may bet or wager a maximum allowed number of credits using a "Bet Max" button 1256.

A spin button 1249 is provided for permitting a player to effectuate a spin of the simulated dice 1241. A player may elect to cash out by pressing a cash out button 1263.

As illustrated, a coin acceptor 1213 and bill acceptor 1214 are provided for accepting wagers by a player. A player card reader 1275 is provided for reading a player card. The player card 1275 may contain credits which can be used to place bets, may contain player information for reading by the machine, and may store game information, such as a qualifying score, as described in more detail below. A ticket dispenser 1276 is provided for dispensing tickets. As described in detail below, the ticket information may comprise game information, such an in-progress or completed game information.

A method of play of the game of Z Jackpot Dice will be described with reference to FIG. 13. In a first step 1320, a player inserts a number of coins (as by coin acceptor 1213), bills (as by bill acceptor 1214) or provides other consideration for playing the game. Consideration may also comprise credits from a player card or the like.

In a step 1322, the player places a wager or bet. In one embodiment, this step comprises the player pressing the "Bet 1" button 1255 or the "Bet Max" button 1256. In one embodiment, a player is permitted to bet between one and five credits. Each credit may comprise any of a number of values, such as $0.05 U.S., $0.10 U.S., $0.25 U.S. or the like. The player may utilize the "Bet 1" button 1255 to place wagers incrementally, or press the "Bet Max" button 1256 to place a maximum bet.

In a step 1324 the player presses the spin button 1249. Upon depressing the spin button 1049, the reels 1241 spin or move (either by mechanical rotation or by computer generated graphics) and then stop. At this point, one symbol is displayed in association with each reel 1241. In the arrangement illustrated in FIG. 12, the symbols six, white O, blue N, one and red S are displayed.

In a step 1326, it is determined if the player placed the maximum bet. If so, then in step 1328 it is determined if the player has received a specific combination of displayed symbols on the reels 1241. In one or more embodiments, a player is declared a winner if the player receives the symbols spelling BONUS. In one embodiment, if the player receives the symbols spelling BONUS in mixed colors, then the player is awarded the bonus amount in the display 1206 for the present column. If the player receives the symbols spelling BONUS in the same colors (i.e. all red, white or blue) then the player is awarded the bonus amount in the display 1206 for all columns 1202.

In one or more embodiments, a player is declared a winner if the player receives the same number on each of the reels 1241 (i.e. all ones, twos), and that number has not already been played. In a preferred embodiment, when the player receives the same number on each of the reels 1241, then the player is awarded the payout for 5 of a Kind as well as the bonus amount.

If the player is a winner, then in step 1329, the total of any winnings is displayed in the total 1205 portion of the column being played. In the preferred embodiment, the column being played is the left-most column 1202 which has yet to be played. The totals of all column 1202 totals are displayed in the total score area 1239.

As an example, if a player receives BONUS spelled in other than symbols of a single color, then the player receives the bonus amount 1206 for that column. That amount is then placed into the total portion 1205 of that column and then indicated in the total score area 1239 along with any other previous total amounts. If a player receives BONUS spelled in a single color, then the player receives the bonus amount 1206 for each and every column. In such event, the totals 1205 for each column 1202 are updated to reflect this winning, as is the player's total score. If a player receives a 5 of a Kind of a new target number, then the player is awarded the payout for a 5 of a Kind and the bonus amount, and the first open column 1202 is highlighted and the target number displayed thereabove.

In a step 1330, once the player has been declared a winner, it is determined if the player received a win by a 5 of a Kind or receiving the BONUS symbols. If the player received a 5 of a Kind win, then in step 1332, it is determined if the player wishes to cash out (as via a step 1348 as described below).

If the player won by receiving the BONUS symbols, then the player is entitled to respin again in an attempt to obtain a combination of target numbers, as in step 1224. Of course, if the player again receives a win on the first spin, the process repeats. If the player received the same number on each of the reels, i.e. a 5 of a Kind, then the play for that particular target number is completed and the player moves to the next round. In one or more embodiments, the player may be required to place another bet in order to spin again after having received a win by hitting the BONUS win.

If in step 1326 it is determined that the player did not place a maximum bet, then in step 1334 it is determined if the player received a 5 of a Kind of a new target number. If so, then in step 1336, the player is awarded the payout for that combination, and the award is displayed in the appropriate column. It is next determined if the player wishes to cash out in step 1348.

If in steps 1326 and 1334 it is determined that the player did not receive a BONUS win or a 5 of a Kind, then in step 1338, the player is permitted to "hold" any of the reels 1241 which display a number. When the player holds a particular number, that that number becomes the target number. For example, referring to FIG. 12, the player may wish to hold the six displayed in the first column 1202.

In a step 1240, when the player makes a hold selection, the target number is displayed in the first available column 1202 of the scorecard 1201. In one embodiment, the first available column comprises the left-most column 1202 which has not been utilized during the game. Preferably, the target number is illustrated by illustrating the target number on the dice at the top of the column. In the example given above, a dice displaying a six would be displayed in the left-most column 1002.

In one or more embodiments, a player is not permitted to select as a target number a number which has already been played in a particular game. If the player attempts to do so, a message may be displayed in the text message box 1245 to the effect that the selected number has already been played and the player must either select a new target number or spin again. Another spin may be required where the first spin results in only numbers which have already been utilized. In addition, if the player selects more than one number (such as a simulated dice 1241 displaying a five and another displaying a two) the player be instructed that the action is not permitted and the player must select only one target number. Also, a player is not permitted to hold any of the non-numeric symbols, such as B, O, N, U or S.

Preferably, when a number is selected, the particular column 1202 is highlighted, such as in brightness or a different color, to aid the user in identifying which information is pertinent to the present round of the game. In addition, once a particular target number is selected, the payouts are highlighted in the central payout portion 1204 of the scorecard 1201.

In one or more embodiments, the particular payout is dependent upon the player's wager, with the payout increasing with an increasing wager. These payouts may be similar to those described and illustrated above.

In one embodiment, payouts for combinations of target numbers which are eliminated may be removed from the scorecard 1201. For example, the payout for a 3 of a Kind may be removed from the column 1202 being played when the player has already received at least a 4 of a Kind. In addition, the payout which the player has already received upon the first spin for that target number may be highlighted to bring to the attention of the player that he or she has already won. This highlighting may be by displaying the payout in a distinguishing color or brightness or other means available. The word "paid" may be indicated in the particular area of the scorecard 1201 as well.

In accordance with the present invention, in a step 1342, after holding one or more of the reels 1041, or after an indication that no reels 1241 can be held, then the player presses the spin button 1249 again. All of the reels 1241 which were not held spin and then stop, again displaying a number.

In a step 1344, it is determined if the player has received any predetermined winning combinations. If the player did not hold any of the reels 1241, it is possible that on the second spin the player received the symbols spelling BONUS. Preferably, the player is awarded a win as described above for spelling BONUS, if the player has placed the maximum bet. In any event, if the player spells BONUS, that player is entitled to an extra spin in order to permit the player to receive the maximum number of the target numbers.

It is also determined if the player has received a combination of the target number which qualifies as a win. In the embodiment illustrated, the player is a winner if he or she receives at least three of the target number, such as 3 of a Kind, 4 of a Kind or 5 of a Kind of the target number, or if the player receives a full house (i.e. 3 of a Kind of the target number plus a pair of another number).

A win total is displayed in the win total area 1205 of the particular column. This win total may be 0, in the event the player did not receive a winning combination (for example, a player may elect to hold two dice showing the target number after the first spin and not receive any additional dice showing the target number after the second spin, thus not receiving a minimum three of the target number for an award). The total payout to the player may be updated in the winner paid display area 1271.

In a step 1346, the win totals from all win total areas 1205 are displayed, then summed and displayed as a total score in the total score area 1239. Preferably, a qualifying score for a jackpot bonus is displayed in the qualifying score area 1240, again which the player may compare their score.

In a step 1348 it is determined if the player wishes to cash out. This is indicated by a player pressing the collect button 1263. In such event, any accumulated winnings and credits are paid to the player. In that event, the game ends.

If the player wishes to continue the game, it is determined in a step 1332 if all of the columns 1202 of the scorecard 1201 are filled (i.e. all of the target numbers have been played). If so, then the player has completed the game. In a step 1350, the player's total score is then compared to the qualifying score to determine if the player qualifies for participation in the jackpot. If the player qualifies, then in a step 1248, the player is provided with a voucher or the like, in similar manner to that described above. This voucher may be dispensed by the jackpot ticket dispenser 1276.

If all of the columns 1202 of the scorecard 1201 are not filled, the player may, repeating again to step 1224, place a bet or wager. The player may be provided with an indication in the text message box 1245 after a given round that they may place a bet to continue with the game.

In a preferred embodiment, after a particular target number has been played in a round, that target number is removed from each reel 1241. Preferably, the space for the removed target number is made blank. In other embodiments, as described above, the symbol may be replaced.

Further, upon the beginning of the next round, the column 1202 for the last target number is darkened or the like so that the player's attention is directed to the now active column 1202. It is preferred, however, that any winning amounts to the player still be displayed in the prior columns 1202 for identification by the player. In addition, it is preferred that the bonus amount for each played column be removed so as to not confuse the player. In such event, the bonus amount for each previously played column is placed in a bonus pool for award to the player in the event the player receives a combination of the letters BONUS in all of the same color.

The game then continues as described above. It will be appreciated that after a first target number has been played, a spin of the reels 1241 may result in a display of all of the remaining numbers and/or the symbols used to replace the already played target number. As the number of played numbers increases, the probability of receiving a target number decreases. For this reason, as detailed above, the payout for receiving a winning combination of each target number increases as the game progresses.

It will be appreciated that the particular symbols which are utilized in the game of Z Jackpot Dice may vary. For example, the non-numeric symbols need not comprise the letters B, O, N, U and S, and do not need to comprise one of each in three different colors. For example, the non-numeric symbols might comprise pictures of fruit or other items. Differing combinations of the non-numeric symbols may be achieved through color, size or other designation. In addition, a greater or lesser number of non-numeric symbols may be provided with each reel. For example, there may be only two, or as many as four or more of each of the letters, each in different colors.

It will also be appreciated that in one or more embodiments, player may be permitted to hold one of the non-numeric symbols, i.e. B, O, N, U, and/or S, in an attempt to gain a winning combination of such symbols on a second spin or play.

While a specific order of events has been described for the play of Z Jackpot Dice, the order of events and activities may be varied from that above. For example, the times at which columns are highlighted, played numbers are indicated at the top of the columns and the like may vary from that described above. In this regard, the above-description is simply exemplary of an implementation of the concepts of the Z Jackpot Dice game.

Utilizing a local area computer network 301 and a wide area computer network 401, multiple players may play the game Z Sixty Six, Z Hot Dice or Z Jackpot Dice against one another instead of "against the house." Utilizing a local area computer network 301, each participating player deposits money into an individual computer-controlled slot machine 101 for each spin. The player who achieves the highest game score of all of the players who are participating in that multiple player game on the local area computer network 301 wins the money deposited by the various participating players (typically, minus a percentage for the house). The same methodology can be utilized across a wide area computer network 401, allowing players at different physical locations to compete against each other in real time.

As described above, in any of the games of the invention, including Check, Z Sixty Six, Z Hot Dice and Z Jackpot Dice, a player may attempt to obtain a high total score for qualifying for a jackpot. In one or more embodiments, the jackpot comprises a percentage of the monies wagered by the players of the game(s). In this manner, the jackpot continues to increase over time with play, and over time, may comprise multi-million dollars in size. The jackpot may comprise monies belonging to the establishment offering the game, and may comprise other than cash prizes.

In one or more embodiments, jackpot prizes are awarded at various intervals. The interval may be daily, weekly, monthly, yearly, or the like. The intervals may vary or be evenly spaced.

In a preferred embodiment, jackpot prizes are awarded to one or more players who have achieved a high score playing the game. In one embodiment, a set number of players, such as twenty, who have achieved the highest scores playing the game during a jackpot interval may participate in the jackpot. For example, the jackpot may be awarded on the 1$^{st}$ of each month, with the players who have achieved the twenty highest scores during the previous month participating in the jackpot. Of course, a gaming establishment may determine the total number of participants.

The participation by the players in the jackpot may be even (i.e. divide the jackpot by the number of participating players) or may be on a sliding or other scale where the higher the player's ranking, the greater that player's participation in the jackpot. The jackpot may also be a fixed amount for each player, or be fixed based on their ranking.

Of course, the manner by which a player is determined to be entitled to participate in the jackpot may vary; For example, players having the lowest scores may be entitled to participate.

Those of skill in the art will appreciate the enticement of such a jackpot award system to a player. In this arrangement, a player need not receive any specific predetermined winning combination or point total. Instead, a player need only achieve a sufficiently high score to be included in the jackpot award. The high score is not fixed, but is dependent upon the scores of other players. Thus, during any particular jackpot interval, the score which a player needs to achieve to participate in the jackpot may vary.

A player may track whether or not they are in the running to win the jackpot during a given payout interval. The player may compare their score(s) against the minimum qualifying score at any time to determine if they are still entitled to participate in the jackpot. A player may determine that their score is no longer high enough to qualify for jackpot participation (such as by reason of a number of later players receiving higher scores and displacing the player from the top twenty highest scores). In such event, a player may play one or more games before the award of the next jackpot in an attempt to re-qualify.

In one or more embodiments, the jackpot qualifying scores may be published, such as on the Internet, permitting a player to conveniently track their participation. In addition, the list of winners of a particular jackpot may be published. The winners may be listed by winning number, which number is printed on the player's voucher. The player may then redeem the voucher for their jackpot award at a gaming establishment or other location.

Alternatively, achieving a predetermined score may be utilized for awarding a predetermined jackpot. For instance, if a player achieves a perfect score, meaning the theoretically highest score for each category, then a jackpot may be awarded for such achievement.

It will be appreciated that the predetermined winning combinations and their payouts may vary from those described and illustrated herein. For example, instead of attempting to achieve a five of a kind of a given number, a player may be directed to achieve a full house, a straight or other combinations. In one or more embodiments, especially when bonuses or jackpots are not awarded, winning combinations may include the more commonly obtained 2 pair or even a single pair. It will be appreciated that when a portion of the wager is diverted to the generation of bonus and jackpot payouts, paying on such commonly occurring combinations is less desirable, as the hold for the game may be minimal or non-existent to the house.

In addition, the total number of reels or simulated dice may be varied. In the examples illustrated, 5 or 6 of such simulated dice or reels are illustrated and described. However, the games may be played with a lesser number or greater number (i.e. such combination as 7 of a Kind being obtainable, or a maximum of 4 of a Kind). Those of skill in the art will appreciate that as the total number of available combinations changes, the payouts may need to be changed in order to both entice a player into playing and yet prevent the house from risking loss.

In the above-described games, a player may preferably save a game in progress by pressing the touch-sensitive save-restore game button 559/pause game button 1059. The computer program 601 then utilizes the machine-readable medium reading and writing device 129 to write the present scores and game states to a card, voucher (such as a printed ticket or token) or other medium which the player can take with them. The player may later resume the saved game by inserting such card or voucher of machine-readable medium into the reading and writing device 129 of any computer-controlled slot machine 101. The saved game information is then read from the card or voucher to initialize the conditions and states of the computer-controlled slot machine 101. In various embodiments, a magnetic or optical or semiconductor medium may be used as desired to store and transfer scores and game states and other pertinent data on such card or voucher produced by the video slot machine 101. In one or more embodiments, when the player elects to pause or save a game in progress, game state information is generated. This information may be stored to the medium which is provided to the player, or may be stored remotely, such as at a central server associated with the games when they are linked. In such event, a code or other information need only be stored or associated with the medium provided to the player. When the code is read or inputted into a game at a later time, the code may cause the game to access the game state information stored separately from the medium. In this manner, a player may be permitted to cease playing a game at a first time and pickup that same game at a later time, and even at a different gaming station offering the game. It will be appreciated that such a similar function may be applied to the game of Z Jackpot Dice or even games other than those described herein, such as those games now known or later invented. Further, it should be noted that the games may be arranged so that a player may engage the pause function, as well as the cash-out and other features of the games, at times other than those specifically described above. For example, a player may be permitted to pause a game at any point, and not specifically only after the completion of a given round of play.

It will be appreciated that games in accordance with the invention need not be the same as those described above. In one or more embodiments, the game may comprise simply implementation of the basic concept. In such an arrangement, the game may includes the steps of a player placing a wager, the providing of a set of symbols, displaying a number of the symbols from the set of symbols, the player having the opportunity to hold none, one or more of the symbols, displaying replacements symbols to those which are not held, comparing the final set of displayed symbols to predetermined winning combinations of symbols to determine if the player is entitled to a winning payout, and then removing from the set of symbols at least one of the symbols, thereby reducing the possible number of combinations achievable thereafter by the player. Preferably, as the number of combinations which the player may achieve are reduced, the payout for achieving a winning combination increases.

As in the embodiments described above, the symbols are or include the faces of dice. As target numbers are played, those number or indicia are removed from play. Of course, such a game may utilize other indicia. For example, such aspects of the game may be applied to a "slot-type" machine which includes reels displaying symbols such as cherries, 7s, bells and the like. As rounds, hands or the like of play are completed, the symbols may be removed randomly or in accordance with winnings combinations received by the player.

In such a game, other features such as jackpots and bonuses may be omitted. On the other hand, any combination of jackpots or bonuses as described herein may be applied to such a game or any of the games herein.

In particular, a number of other alternate embodiments or alternate arrangements to the games other than as described above are contemplated. First, it will be appreciated that one or more of the features of any one game described above may be applied to another. By way of example, a player may be permitted to "hold" the simulated dice in the game of Z Sixty Six as well as in the games of Check and Z Hot Dice. In addition, the replacement symbols utilized in the games of Check and Z Sixty Six may, as in the case of Z Hot Dice, comprise symbols which either prevent a player from obtaining what appears to be a unique or winning combination of replacement symbols, or may comprise a combination of symbols which permits a player to receive a winning combination of replacement symbols.

In any of the embodiments, the replacement symbols may comprise no symbol at all, but comprise a blank.

A variety of criteria may be applied to the games of the invention for determining when a player has qualified or completed a round or category. For example, as described above, a player may be required to receive at least 3 of a Kind to start play. In one or more embodiments, a player may be required to play until they achieve at least a 3 of a Kind before any score is attributed to a particular category (i.e. not just the first). For example, after completing a first target number if on the next two spins the player achieves at most a pair, the player may be required to place an additional wager and utilize two more spins in an attempt to gain at least 3 of a Kind. In other embodiments, such as described above, the player may receive a zero score if they do not receive a winning combination on each set of spins. For example, after completing a first target number or category, if on the next two spins a player receives only a pair of the same indicia, the score for that category may be credited as zero, and then the player forced to move to the next target number or category.

In one or more embodiments of the invention, a player may be declared a winner for receiving other combinations of symbols/events. For example, a player may be paid a special award or winning or receiving at least 4 of a Kind of each target number. For example, in the embodiment illustrated in FIG. 12, an additional column 1202 may be provided which indicates the amount of a bonus the player may receive for obtaining a 3 of a Kind, 4 of a Kind or the like of each of the target numbers in the other columns. Such a bonus may be utilized in addition to a "per-column" bonus as described above in the game of Z Jackpot Dice or the jackpot as described herein.

In one or more embodiments of the invention, may as described above with respect to the game of Check, not include the step of removing one or more of the symbols as game progresses. Instead, the player may continue play, attempting to achieve winning combinations, jackpots, bonuses (or other of the features/elements) using the same set of symbols as play progresses.

In an alternative embodiment, the games of Check, Z Sixty Six, Z Hot Dice or Z Jackpot Dice or other game variations described herein may be played over the Internet or other wired/wireless communications network/system among a random collection of players at diverse locations, forming a virtual wide area network of such competing players.

In alternative embodiments, numerous other wagering games, including but not limited to Poker Dice, and Aces in the Pot may be configured for play and display on the display 115, and played over a local area computer network 401 or wide area computer network 501 of computer-controlled slot machines 101.

As used herein, the term "computer-controlled slot machine" denotes a computer controlled machine which facilitates wagering, which generally requires the input of money in order to be operated, and which outputs money in response to the achievement of winning wagering results. It will be appreciated that one or more aspects of the machine, including the interface or what is referred to herein as the touch sensitive display may be electrical, mechanical and/or electro-mechanical in nature. For example, while the buttons may comprise touch-sensitive areas of a display, they may comprise electromechanical buttons which are activated by mechanical movement (such as depression) by a player. In addition, the simulated dice may, instead of comprising solely computer generated images, actually comprise dice or dice faces mounted on a rotating reel and arranged to stop in controlled positions. The simulated dice or other symbols may be provided in a variety of other manners, such as by laser light generation. The dice or other symbols are referred to in certain instances as "simulated," but could actually comprise faces of actual physical dice. The displays and display areas may comprise CRT type displays, LCD or LED displays or any other means for displaying information now known or later developed.

Of course, the present invention is not limited to the generation and display of images in the form of the video simulated dice 541 illustrated in FIG. 5A, FIG. 5B, and FIG. 9 or reels 1241 as illustrated in FIG. 12. In other embodiments, other images are generated and displayed in the course of game play. For example, in one embodiment, the images generated and displayed are in the form of different colors. In another embodiment, graphical representations of different types of fruit are generated and displayed. In yet another embodiment, roman numerals are utilized. The generation and subsequent display of any image in a set of at least two display areas in the course of game play is within the scope of the present invention.

It will be appreciated that various features of the present invention may be applied to existing games or games later developed. For example, the feature of permitting a player to "pause" a game and then continue the game at one or one of several gaming machines may be applied to present or future games. For example, the pause feature may be applied to video poker games or the like. Likewise, the feature of having bonuses associated with more than one event and/or cumulative bonuses may be applied to present or future games. For example, a typical slot machine may be configured to include particular winning combinations which, when received by a player, entitle the player to a first bonus. Additional bonuses may be won by receiving other combinations, and a total bonus may be awarded for receiving yet another special combination.

Another feature which may be applied to the games of the invention involves the duplication of displayed dice or symbols after a spin into additional "hands." For example, after a first spin, a player may elect to hold a target number which is displayed three times (i.e. a 3 of a Kind). These same symbols may then be displayed in one or more additional rows or hands. The player may then be permitted to spin again, in an attempt to achieve a winning combination in any or all of the hands or rows. In the example given, either 2 or 3 additional symbols (depending on whether each row had a maximum of 5 or 6 symbols) would be displayed randomly to fill each row. The combination of the newly displayed symbols and the three originally held symbols would then be evaluated to determine if the player had won. The player may be awarded a payout for each winning row, or only for rows for which the player placed a wager. Alternatively, the player might be permitted to retain the highest winning combination from the several rows for determining the payout to be awarded in the column for that target number.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method of playing a multi-player jackpot game which includes the play of individual games by individual players, said individual games presented on an electronically controlled gaming machine, comprising the steps of:

accepting a wager by a player;

presenting said individual game in which said player attempts to fill a set of categories, each of said categories having criteria for determining if said category is met by a combination of dice indicia, said game comprising the steps of:

(a) rolling a set of simulated dice to generate a set of dice indicia;

(b) displaying said set of dice indicia to said player;

(c) permitting said player to hold none, one or more of said set of dice indicia and re-roll all simulated dice not held a predetermined maximum number of times to generate a hand of dice indicia;

(d) filling one of said categories by assigning said hand of dice indicia to one of said categories based upon said criteria, once a category is filled, said category not being reusable until another game, and in the event said hand of indicia does not meet the criteria for any remaining unfilled category, assigning said hand of dice indicia to one of said unfilled categories;

(e) assigning a score to said hand of dice indicia based upon the criteria assigned to said category to which said hand of dice indicia was assigned, said assigned score being 0 if said hand of indicia did not meet the criteria for any remaining unfilled category;

(f) repeating steps (a)–(c) until each of said categories is filled;

(g) generating a total score comprising the sum of said assigned scores; and (h) determining if the player is a winner of said individual game by determining if said individual player's total score exceeds a score necessary to be declared a winner of said individual game and if so, awarding said player a winning;

said multi-player game further comprising the steps of:

(i) providing a jackpot amount;

(j) determining a pool of one or more players of said individual game entitled to participate in said jackpot amount based upon the individual player total scores received by players who played said individual game anytime during an interval of time; and (k) awarding said one or more players of said pool at least a portion of said jackpot amount.

2. The method in accordance with claim 1 wherein said criteria for one or more of said categories comprises having a hand of dice indicia including a plurality of identical dice indicia.

3. The method in accordance with claim 1 wherein said simulated dice have sides corresponding to the sides of real dice, and including the step of removing from play one of said sides of said simulated dice when one or more of said categories are filled, preventing said sides of said simulated dice, once removed, from being used in the further play of the individual game.

4. The method in accordance with claim 1 wherein said step of determining said pool comprises determining one or more of the highest total scores received during the interval of time.

5. The method in accordance with claim 1 including the step of permitting individual players to play said individual game one or more times during said interval in an attempt to participate in said pool.

6. The method in accordance with claim 1 including the step of posting one or more of the highest total scores to the players of the individual games during the interval of time for use by said players in determining how high their total score must be to participate in said pool.

7. The method in accordance with claim 1 wherein said player is permitted to assign said hand of indicia to said category.

8. The method in accordance with claim 1 wherein said hand of indicia is automatically assigned to said category by said gaming machine.

9. The method in accordance with claim 1 wherein said step of rolling a set of simulated dice comprises spinning one or more reels having dice side indicia displayed thereon.

10. The method in accordance with claim 1 wherein said player is permitted to re-roll said simulated dice a maximum of three times.

11. The method in accordance with claim, 1 wherein said scores assigned to one or more, but not all, of said hands of dice indicia is based upon a predetermined score associated with said category to which said hand of dice indicia is assigned and is independent of the value of the dice sides of said dice indicia of said hand of dice indicia.

* * * * *

UNITED STATES PATENT AND TRADEMARK OFFICE

CERTIFICATE OF CORRECTION

PATENT NO. : 6,605,001 B1 
DATED : August 12, 2003
INVENTOR(S) : Elia Rocco Tarantino It is certified that error appears in the above-identified patent and that said Letters Patent is hereby corrected as shown below:

Column 5,
Line 20, after the words "Fig. 9", delete "is".
Line 24, after the word "invention", delete ";" and insert -- . --.
Line 27, after the words "Fig. 10", delete ";" and insert -- . --.
Line 29, after the word "invention", delete "; and" and insert -- . --.
Line 43, after the word "invention", insert -- . --.

Column 13,
Line 3, delete the word "give" and insert -- given --.
Line 46, delete the word "acres" and insert -- aces --.

Column 14,
Line 5, after the word "account", insert -- the --.

Column 15,
Line 52, after the word "the", delete "a".
Line 59, delete the word "qualify", and insert -- qualifying --.

Column 20,
Line 4, delete the word "combinations", and insert -- combination --.
Line 66, delete the word "qualify", and insert -- qualifying --.

Column 21,
Line 45, delete "1049", and insert -- 1249 --.

Column 22,
Line 31, delete "1224", and insert -- 1324 --.
Line 50, after the word "that", delete the second "that".
Line 53, delete "1240", and insert -- 1340 --.
Line 61, delete "1002", and insert -- 1202 --.

Column 23,
Line 32, delete "1041", and insert -- 1241 --.

Column 24,
Line 12, delete "1248", and insert -- 1348 --.
Line 16, delete "1224", and insert -- 1322 --.

UNITED STATES PATENT AND TRADEMARK OFFICE

CERTIFICATE OF CORRECTION

PATENT NO. : 6,605,001 B1
DATED : August 12, 2003
INVENTOR(S) : Elia Rocco Tarantino It is certified that error appears in the above-identified patent and that said Letters Patent is hereby corrected as shown below:

Column 25,
Line 49, delete ";" and insert -- . --.

Column 27,
Line 18, delete the word "includes", and insert -- include --.
Line 40, delete the word "winnings" and insert -- winning --.

Column 28,
Line 12, after the word "player", insert -- is --.
Line 17, delete the word "or" and insert -- for --.
Line 28, after the word "as", insert -- the --.

Column 29,
Line 17, delete the word "one" after the word "or" and insert -- more --.

Column 30,
Line 19, delete "(c)" and insert -- (e) --.

Column 32,
Line 1, after the word "claim", delete ",".

Signed and Sealed this

Fourteenth Day of October, 2003

JAMES E. ROGAN
*Director of the United States Patent and Trademark Office*